(12) United States Patent
Yao et al.

(10) Patent No.: US 11,029,496 B2
(45) Date of Patent: Jun. 8, 2021

(54) FOLDED LENS SYSTEM

(71) Applicant: Apple Inc., Cupertino, CA (US)

(72) Inventors: Yuhong Yao, San Jose, CA (US); Yoshikazu Shinohara, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 16/226,510

(22) Filed: Dec. 19, 2018

(65) Prior Publication Data

US 2019/0196148 A1 Jun. 27, 2019

Related U.S. Application Data

(60) Provisional application No. 62/609,291, filed on Dec. 21, 2017.

(51) Int. Cl.
*G02B 5/04* (2006.01)
*G02B 13/00* (2006.01)
(Continued)

(52) U.S. Cl.
CPC ......... *G02B 13/007* (2013.01); *G02B 13/002* (2013.01); *G02B 13/004* (2013.01); (Continued)

(58) Field of Classification Search
CPC .............. G02B 13/007; G02B 13/0065; G02B 13/0035; G02B 13/004; G02B 13/002; (Continued)

(56) References Cited

U.S. PATENT DOCUMENTS

| 7,616,393 B2 | 11/2009 | Border et al. |
| 9,274,311 B2 | 3/2016 | Bone et al. |
| | (Continued) | |

FOREIGN PATENT DOCUMENTS

| EP | 1788419 | 5/2007 |
| WO | 2013154122 | 10/2013 |
| WO | WO-2013154122 A1 * | 10/2013 ......... G02B 13/0065 |

OTHER PUBLICATIONS

International Search report and written opinion from PCT/US2018/066821, (Apple Inc.), dated Mar. 6, 2019, pp. 1-12.

*Primary Examiner* — Mustak Choudhury
(74) *Attorney, Agent, or Firm* — Robert C. Kowert; Kowert, Hood, Munyon, Rankin & Goetzel, P.C.

(57) ABSTRACT

A folded lens system that includes lenses with refractive power and two light folding elements such as prisms. A first lens on a first axis refracts light to a first folding element. The first folding element redirects the light from the first axis onto a second axis on which one or more lenses are arranged. The lenses on the second axis refract the light to a second folding element. The second folding element redirects the light onto a third axis on which a sensor is disposed. The lens system may include a front aperture. The sensor may be moved on the third axis to provide autofocusing, or alternatively the lens system may include one or more optical actuators that provide autofocusing. The lens system may have a low F-number (<=2.8), and may have a 35 mm equivalent focal length in the medium to long telephoto range.

23 Claims, 36 Drawing Sheets

(51) Int. Cl.
H04N 5/225 (2006.01)
H04N 5/232 (2006.01)
G02B 17/08 (2006.01)

(52) U.S. Cl.
CPC ..... *G02B 13/0035* (2013.01); *G02B 13/0065* (2013.01); *G02B 17/086* (2013.01); *H04N 5/2254* (2013.01); *H04N 5/23238* (2013.01)

(58) Field of Classification Search
CPC . G02B 17/086; H04N 5/2254; H04N 5/23238
See application file for complete search history.

(56) References Cited

U.S. PATENT DOCUMENTS

| | | | |
|---|---|---|---|
| 9,819,863 | B2 | 11/2017 | Osborne et al. |
| 2004/0105025 | A1* | 6/2004 | Scherling ........... H04N 1/00241 348/335 |
| 2017/0359566 | A1 | 12/2017 | Goma et al. |

* cited by examiner

F/2.0
35mm Equivalent Focal Length: 85 mm
Solid-state optical actuator in front of the lens for auto-focusing Telecentric Receive light from an object field through an aperture at a first lens element on a first axis.
1900

The light is refracted by the first lens element to a first folding element.
1910

The light is redirected by the first folding element to a second axis.
1920

The light is refracted by one or more lens elements on the second axis to a second folding element.
1930

The light is redirected by the second folding element to a third axis.
1940

The light forms an image at an image plane proximate to the surface of a sensor module on the third axis.
1950

The image is captured by the sensor module.
1960

FIG. 13

FOLDED LENS SYSTEM

PRIORITY INFORMATION

This application claims benefit of priority of U.S. Provisional Application Ser. No. 62/609,291 entitled "FOLDED LENS SYSTEM" filed Dec. 21, 2017, the content of which is incorporated by reference herein in its entirety.

BACKGROUND

Technical Field

This disclosure relates generally to camera systems, and more specifically to small form factor camera and lens systems.

Description of the Related Art

The advent of small, mobile multipurpose devices such as smartphones and tablet or pad devices has resulted in a need for high-resolution, small form factor cameras that are lightweight, compact, and capable of capturing high resolution, high quality images at low F-numbers for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens systems with improved imaging quality performance has increased. In addition, there are increasing expectations for small form factor cameras to be equipped with higher pixel count and/or larger pixel size image sensors (one or both of which may require larger image sensors) while still maintaining a module height that is compact enough to fit into portable electronic devices. Thus, a challenge from an optical system design point of view is to provide an imaging lens system that is capable of capturing high brightness, high resolution images under the physical constraints imposed by small form factor cameras.

SUMMARY OF EMBODIMENTS

Embodiments of the present disclosure may provide a folded lens system that may, for example, be used in small form factor cameras. Embodiments of the folded lens system may include two or more lens elements with refractive power and two light folding elements such as prisms. In some embodiments of the folded lens system, a first refractive lens element on a first axis refracts light received from an object field in front of the lens system to a first light folding element. The first light folding element redirects the light refracted by the first lens element from the first axis onto a second axis on which one or more refractive lens elements are arranged. The refractive lens element(s) on the second axis refract the light to a second light folding element. The second light folding element redirects the light refracted by the lens elements on the second axis onto a third axis on which a sensor module of a camera is disposed. Embodiments of the folded lens system may also include a front aperture stop located at the first lens element at or behind the front vertex of the lens system.

In some embodiments, instead of positioning the first refractive lens element on the first axis and thus on the object side of the lens system, the first refractive lens element may be on the second axis, between the first light folding element and a second refractive lens element. This may provide an even shorter Z-axis height for the lens system.

Embodiments of the folded lens system may provide a low F-number (<=2.8), and may be configured to operate with a relatively narrow field of view and a 35 mm equivalent focal length ($f_{35\ mm}$) in the medium to long telephoto range. For example, some embodiments of the compact folded lens system may provide a 35 mm equivalent focal length in the range of 70-200 mm (e.g., 85 mm), with less than 6.5 mm of Z-height to fit in a wide variety of portable electronics devices.

Lens system parameters and relationships including but not limited to lens shape, thickness, geometry, position, materials, spacing, and the surface shapes of certain lens elements may be selected at least in part to reduce, compensate, or correct for optical aberrations and lens artifacts and effects across the field of view.

In some embodiments, the folded lens system may include an infrared (IR) filter to reduce or eliminate interference of environmental noise on the photosensor. The IR filter may, for example, be located between the second light folding element and the sensor module. In some embodiments, the lens system is a fixed-focus lens. However, in some embodiments, the sensor module may be mechanically moved on the third axis relative to the second light folding element to provide autofocus (AF) functionality for the camera, or alternatively the lens system may be mechanically moved on the third axis relative to the sensor module. As an alternative, in some embodiments the lens system may include one or more solid-state optical actuator components (e.g., an optical actuator component located in front of the lens system that provide AF functionality for the camera without requiring any of the components to be moved.

BRIEF DESCRIPTION OF THE DRAWINGS

FIG. 13 is a flowchart of a method for capturing images using embodiments of a camera as illustrated in FIGS. 2A through 12, according to some embodiments.

Figure 1:
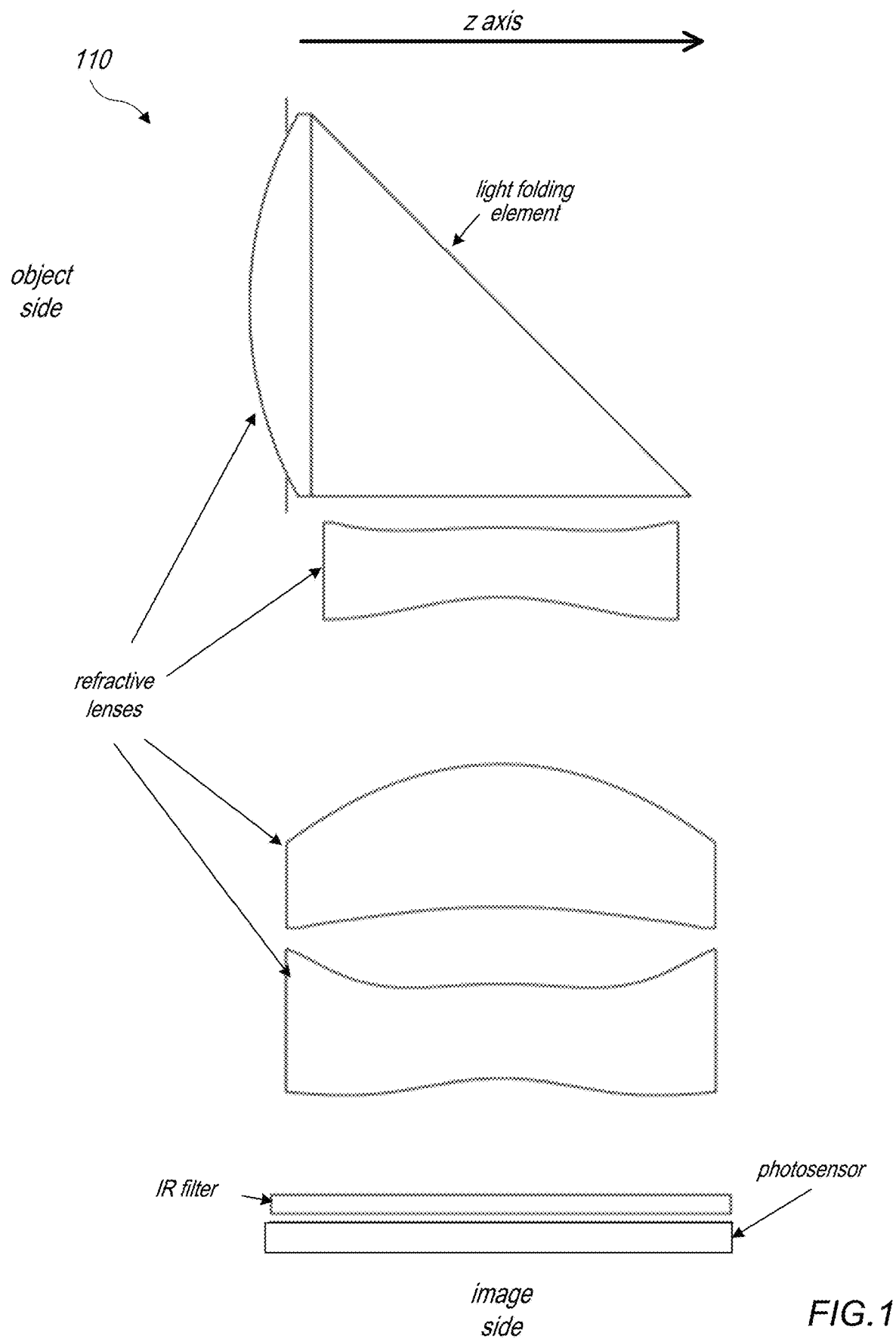
FIG. 1 is a cross-sectional illustration of a folded lens system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a compact folded lens system including lens elements with refractive power, with a first light folding element such as a prism that redirects the light refracted from a first refractive lens element from a first axis onto a second axis on which one or more refractive lens elements are arranged. The lens element(s) on the second axis refract the light so a second light folding element that redirects the light onto a third axis on which a sensor module of a camera is disposed. The lens system may include an aperture stop, for example located at or behind the front vertex of the lens system, for example at the first lens element, and an optional infrared filter, for example located between the second light folding element and the sensor module. The shapes, materials, and arrangements of the refractive lens elements in the lens system may be selected to capture high resolution, high quality images. In some embodiments, instead of positioning the first refractive lens element on the first axis and thus on the object side of the lens system, the first refractive lens element may be on the second axis, between the first light folding element and a second refractive lens element.

Conventionally, compact imaging lenses can be designed with a non-folded optical axis that provide a 35 mm equivalent focal length ($f_{35\ mm}$) of 50 mm-70 mm. However, the lens brightness (F/#) and image quality of these conventional compact lens designs are typically limited by the constraint in thickness (Z dimension) of portable electronics devices. It is difficult to further increase the lens effective focal length of these conventional compact lens designs due to the scaling relationship with respect to the lens dimensions. To overcome this limitation, a light folding element (e.g., a folding-prism or mirror) may be used to relieve the constraint in the Z dimension of the lens system, for example as illustrated by lens system 110 in FIG. 1.

However, a limitation of the lens system 110 as illustrated in FIG. 1 is that the sensor normal direction is orthogonal to the incoming light direction. This potentially leads to problems including one or more of, but not limited to:

Sensor shifting modules such as optical image stabilization (OIS) and or autofocus (AF) modules may be implemented below the sensor and along the Z direction, which inevitably increase the Z-height; a module may protrude in front of the camera module.

The conventional AF method of longitudinally translating the lens barrel and keeping the sensor still cannot be implemented due to the orthogonality between incoming light direction and the sensor normal.

As sensor technology advances, advanced sensor modules with larger pixel sizes and higher resolutions may be provided; these sensor modules may be larger than conventional sensors, which inevitably increase the Z-height; a module may protrude in front of the camera module.

A solution to this limitation with a lens system 110 as illustrated in FIG. 1 is to introduce a second light folding element so that the sensor normal becomes substantially parallel to the incoming light direction. However, in a lens system 110 as illustrated in FIG. 1, there is not enough clearance to fit a second light folding element. Embodiments of the folded lens system as described herein are configured with a very long back focal length (the distance from the last refractive lens element to the image plane) to provide space for a second light folding element (e.g., a second prism). In addition, arrangements of power distribution, lens shapes, prism form factors, and lens materials may be selected to ensure that embodiments of the folded lens system provide low F/# (e.g., <2.8), high resolution imaging.

Figure 14:
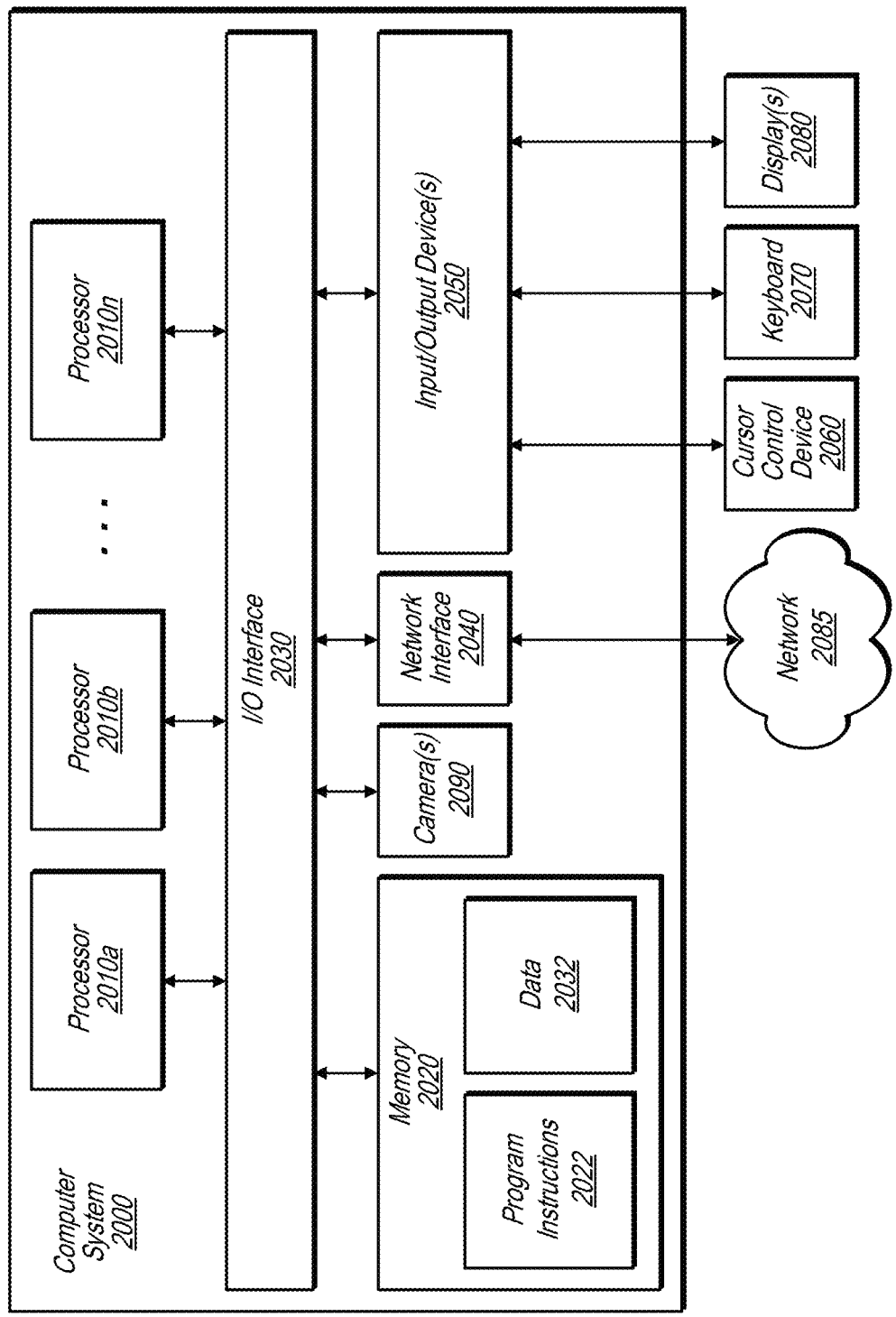
FIG. 14 illustrates an example computer system that may be used in embodiments.

Embodiments of the compact folded lens systems as described herein may provide high resolution, high quality imaging for small form factor cameras. Using an embodiment of the compact lens system, a camera may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers, and so on. FIG. 14 illustrates an example device that may include one or more small form factor cameras that use embodiments of the compact folded lens systems as described herein. However, note that aspects of the camera (e.g., the lens system and sensor module) may be scaled up or down to provide cameras with larger or smaller package sizes. In addition, embodiments of the camera system may be implemented as stand-alone digital cameras. In addition to still (single frame capture) camera applications, embodiments of the folded lens system may be adapted for use in video camera applications.

Figure 2A:
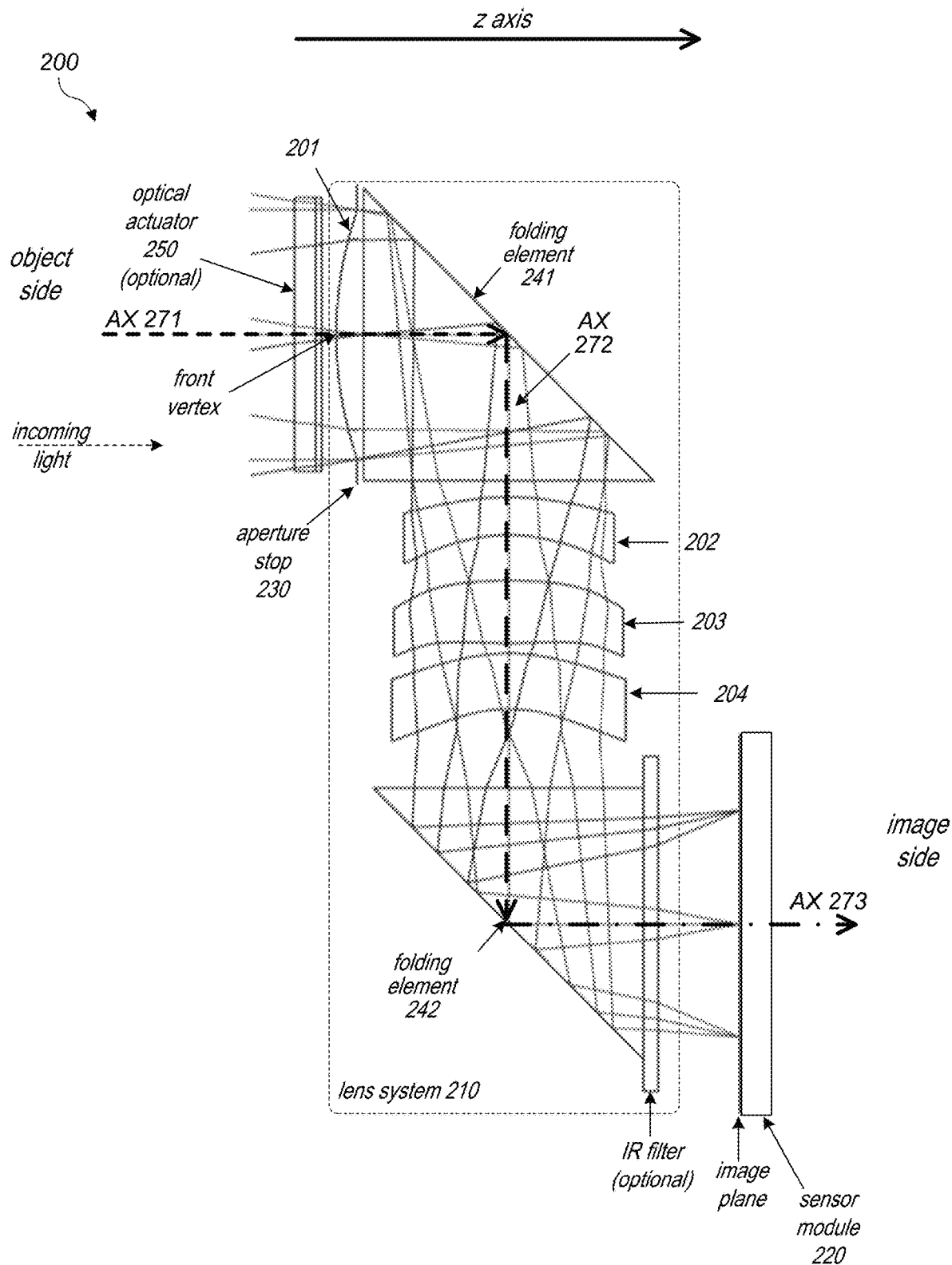
FIGS. 2A through 2C illustrate components and aspects of a folded lens system with two folding elements, according to some embodiments.
Figure 2B:
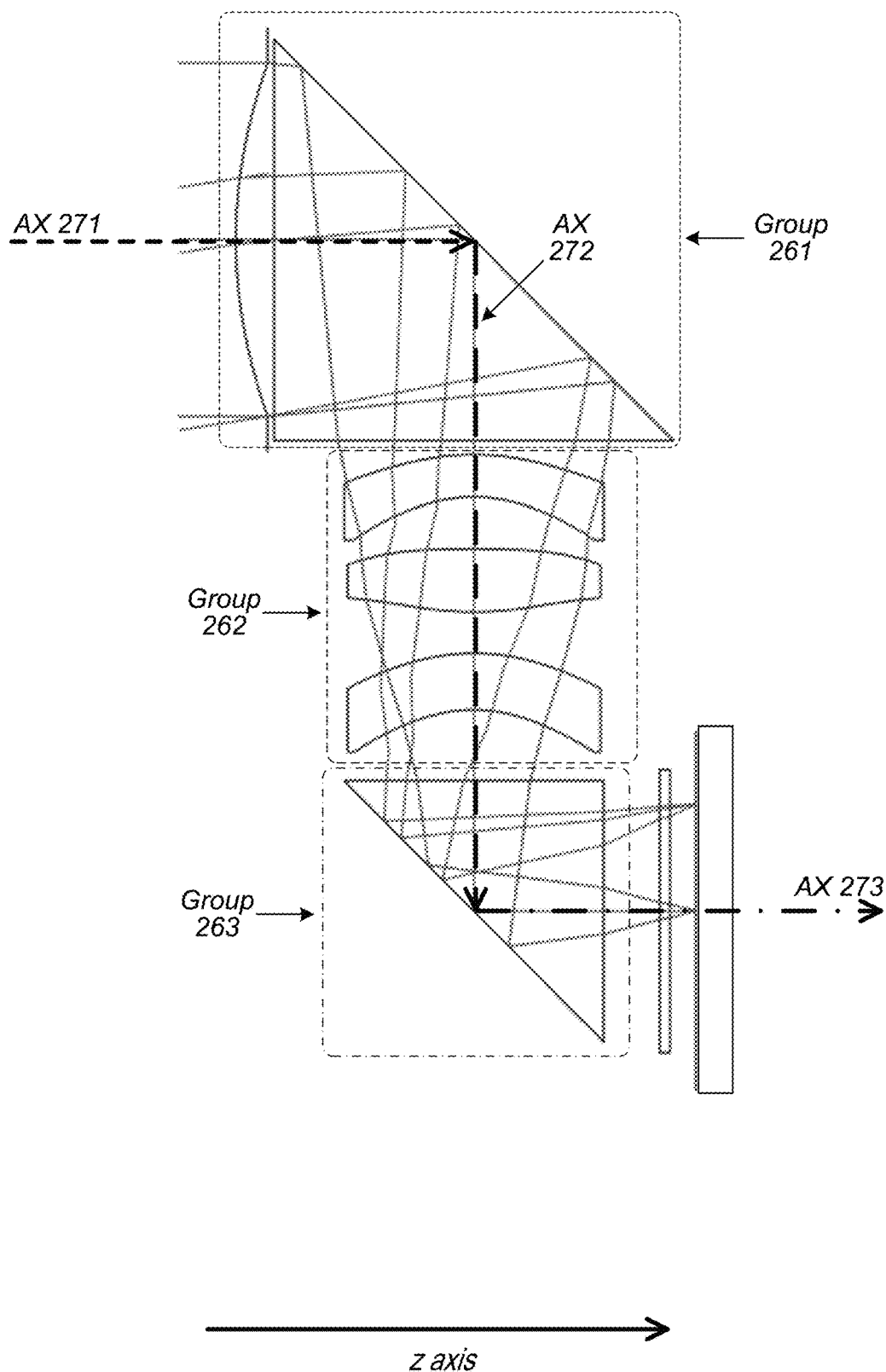
Figure 2C:
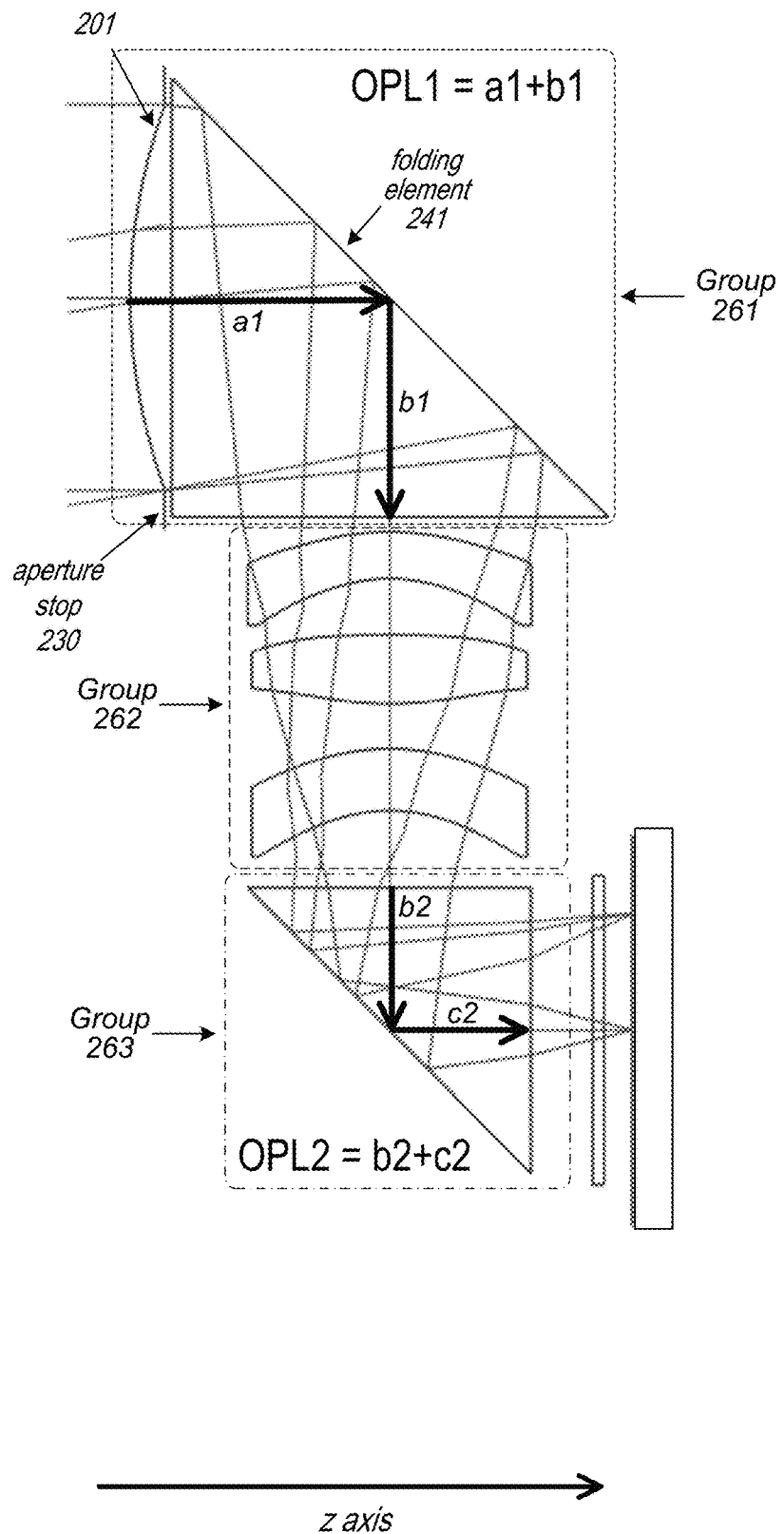

FIGS. 2A through 2C illustrate components and aspects of a folded lens system with two folding elements, according to some embodiments. FIG. 2A is a cross-sectional illustration of an example camera 200 including an example embodiment of a folded lens system 210 with four refractive lens elements 201-204 and two light folding elements 241 and 242 such as prisms that "fold" the optical axis of the lens system 210. While embodiments are generally described as using prisms to fold the optical axis, other methods may be used to fold the optical axis, including but not limited to mirrors. The first folding element 241 folds the optical axis from a first axis (AX 271) that is parallel to the incoming light direction to a second axis (AX 272) that is orthogonal to the incoming light direction. The second folding element 242 folds the optical axis from the second axis (AX 272) that is orthogonal to the incoming light direction to a third axis (AX 273) that is parallel to the incoming light direction. Thus, the second folding element 242 overcomes the above-noted limitations of a lens system with a single folding element as illustrated in FIG. 1.

The camera 200 may also include an aperture stop 230, an optional infrared (IR) filter, and a sensor module 220. In some embodiments, the camera 200 may also include one or more solid-state optical actuator components that provide AF functionality for the camera 200, for example optical actuator 250. A compact camera 200 including an embodiment of the compact folded lens system 210 as illustrated in FIG. 2A may, for example, be implemented in portable electronic devices such as mobile phones and tablets. Embodiments of the lens system 210 may provide a low F-number (<=2.8). The 35 millimeter (mm) equivalent focal length ($f_{35\ mm}$) of the lens system 210 may be longer than 60 mm, for example 85 mm. A compact folded lens system 210 having a long $f_{35\ mm}$ may, for example, be used stand-alone for telephoto photography, or can be paired with a wide-angle imaging lens to enable effective optical zoom for portable electronic devices.

As shown in the example of FIG. 2A, embodiments of the compact folded lens system 210 may include four lens elements 201-204 with refractive power and two light folding elements 241 and 242 such as prisms to fold the optical axis. Note, however, that some embodiments may include more or fewer refractive lens elements. Some embodiments of the compact folded lens system 210 may provide a 35 mm equivalent focal length in the range of 70-200 mm and less than 6.5 mm of Z-height to fit in a wide variety of portable electronics devices. With proper arrangement of materials and lens powers, embodiments of the compact folded lens system 210 are capable of capturing high brightness photos with near diffraction-limited image quality.

As illustrated in the example camera 200 of FIG. 2A, the compact folded lens system 210 may include four lens elements 201-204 with refractive power and two light folding elements 241 and 242 (e.g., prisms), in order from the object side to the image side of the lens system 210: a first lens element 201 with positive refractive power; a first folding element 241 such as a prism to fold the optical axis from AX 271 to AX 272; a second lens element 202 with negative refractive power; a third lens element 203 with positive refractive power; a fourth lens element 204 with negative refractive power; and a second light folding element 242 such as a prism to fold the optical axis from AX 271 to AX 273. In some embodiments, at least one surface of at least one of the refractive lens elements may be aspheric. An aperture stop 230 may be located between the object side of the lens system 210 and the folding element 241 for controlling the brightness of the lens system 210.

Figure 10:
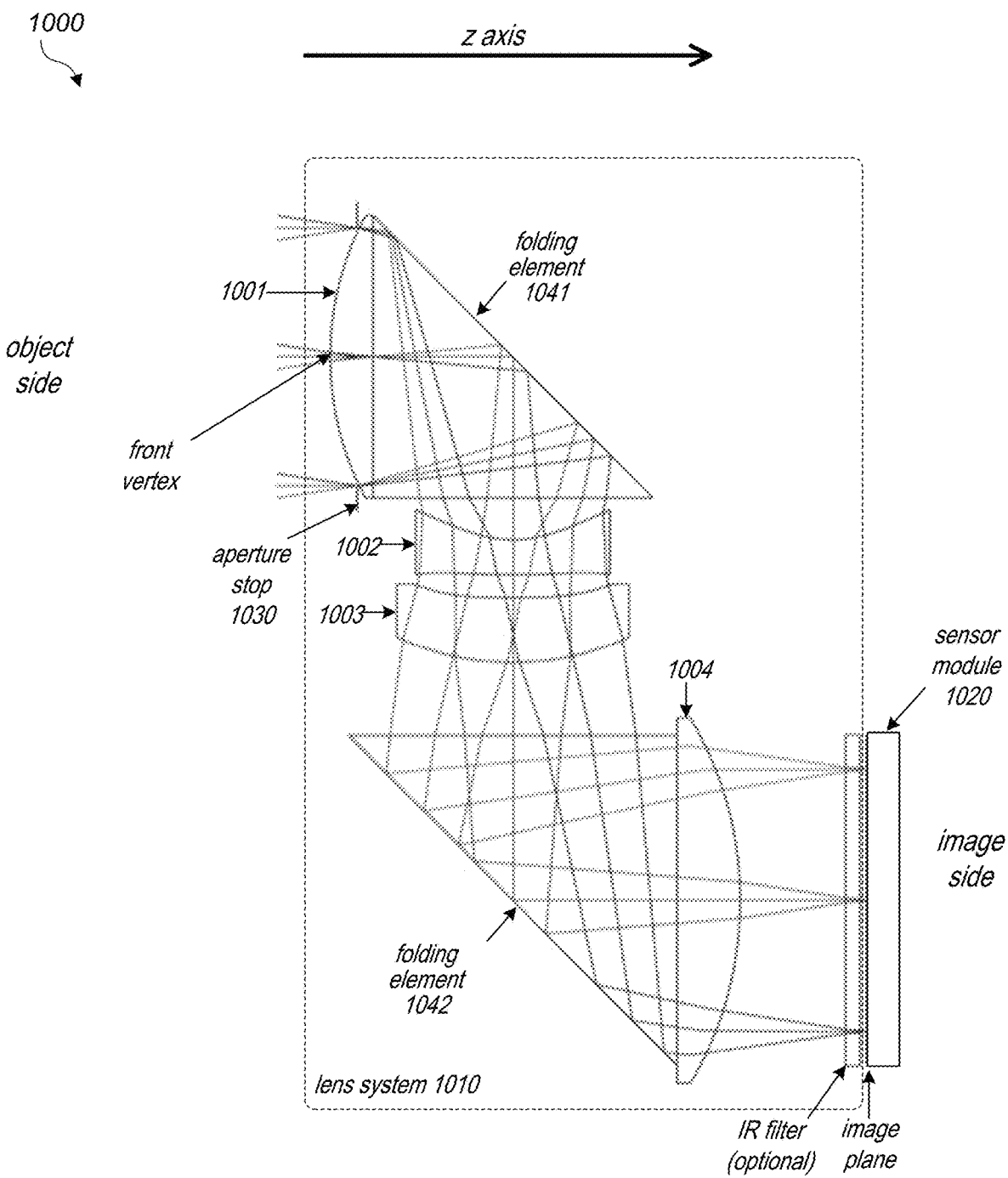
Figure 11:
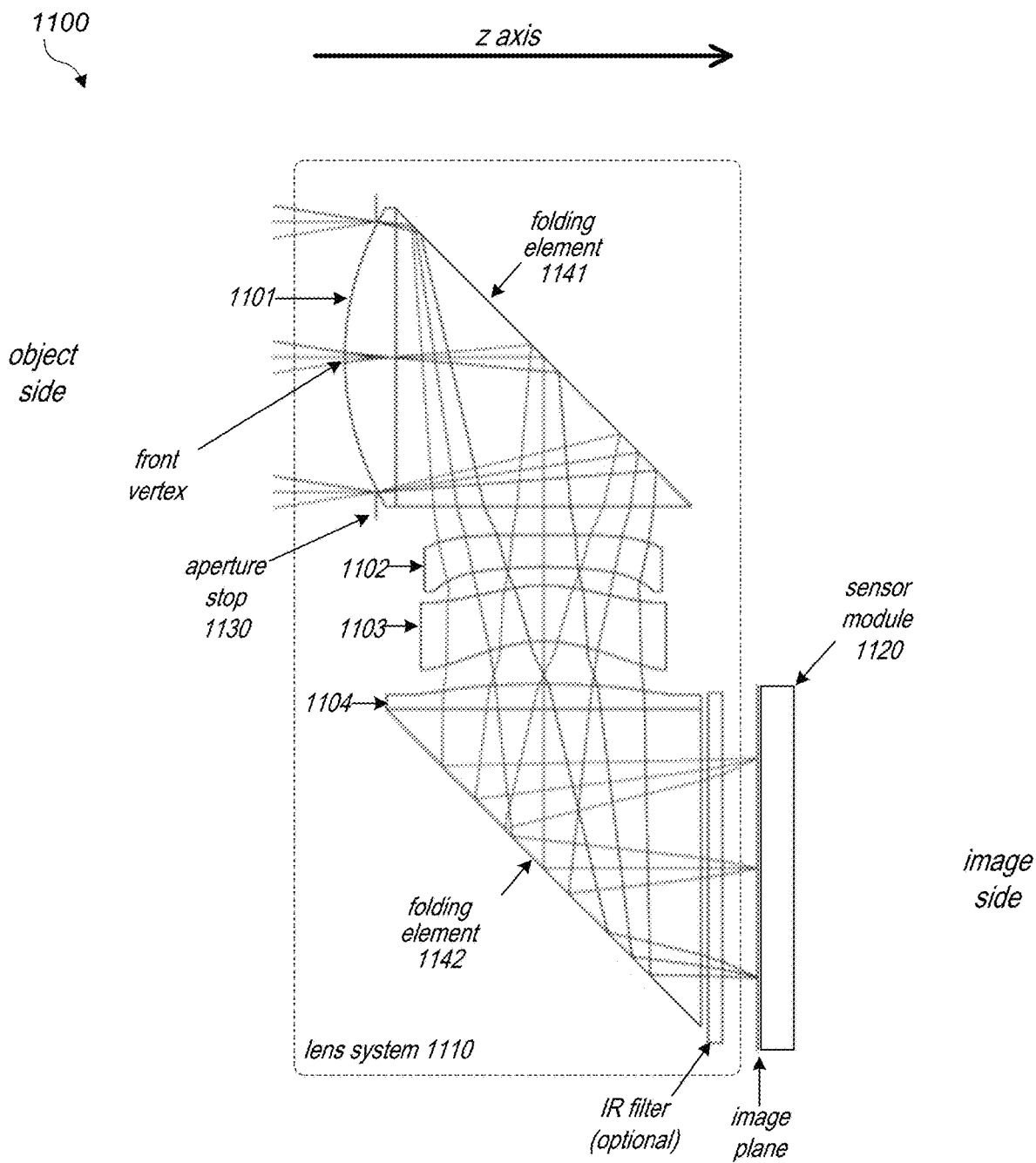
Figure 12:
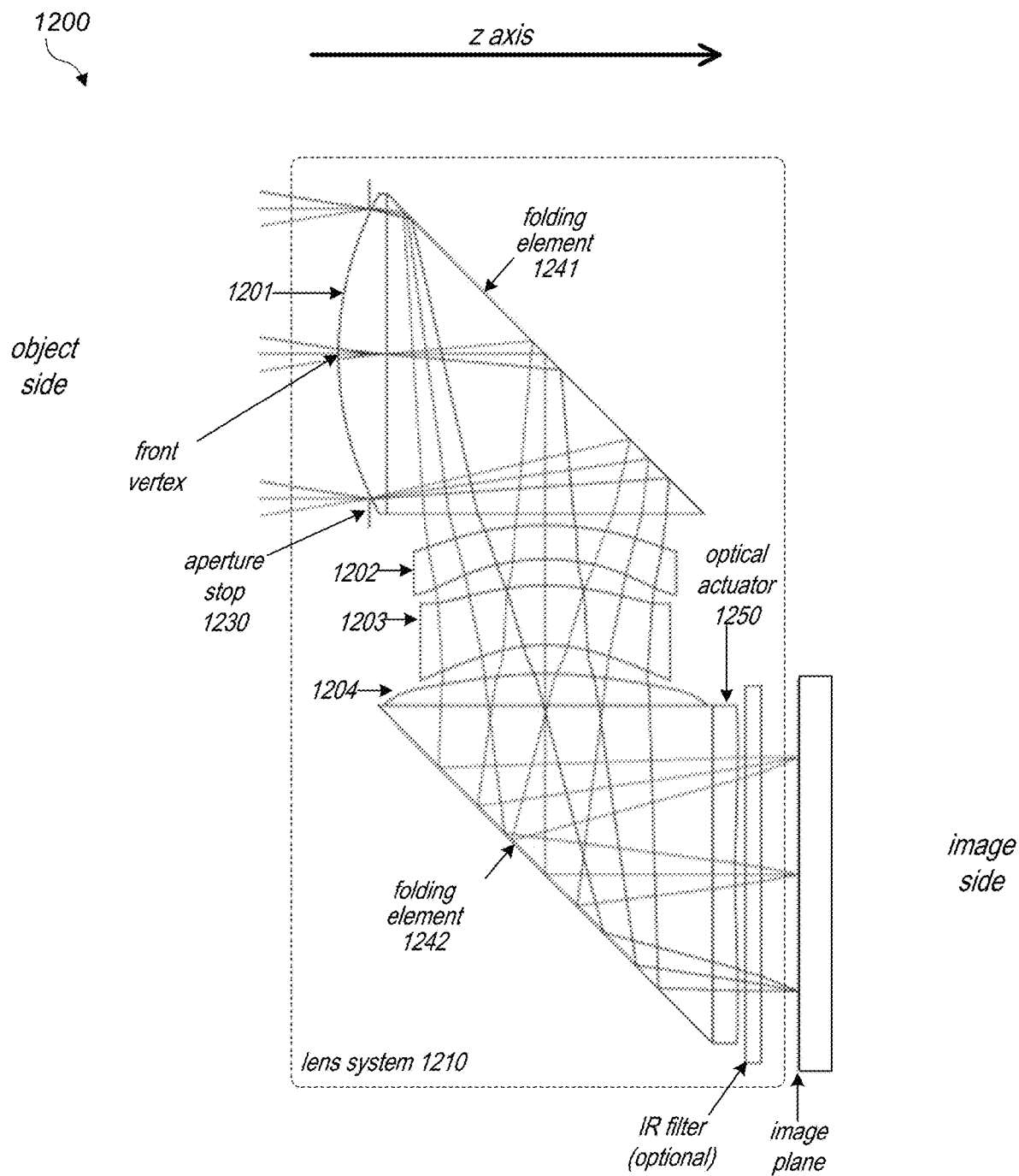

Note that the power order of the refractive lens elements may be different in some embodiments, and some embodiments may include more or fewer refractive lens elements. Further note that, in some embodiments, lens element 201 may have a flat/plano image side surface and may be in contact with or integrated with (no air gap) folding element 241. In addition, in some embodiments, at least one lens element may be integrated with folding element 242, for example as illustrated in FIGS. 10 through 12. In some embodiments, instead of positioning the first lens element 201 on the first axis and thus on the object side of the lens system 200, the first refractive lens element 201 may be on the second axis, between the first folding element 241 and lens element 202.

In some embodiments, the camera 200 includes an IR filter 250, for example located between light folding element 242 and sensor 220, to reduce or eliminate interference of environmental noises on the sensor 220. In some embodiments, the sensor 220 and/or lens system 210 may be shifted along AX 243 to allow refocusing of the lens system 210 between Infinity conjugate and Macro conjugate. As an alternative, in some embodiments, the camera 200 may also include one or more solid-state optical actuator components that provide AF functionality for the camera 200, for example optical actuator 250. In various embodiments, lens elements 201, 202, 203, and/or 204 may be round/circular or rectangular, or some other shape. Note that in various embodiments, a folded lens system may include more or fewer refractive lens elements, and the lens elements may be configured or arranged differently.

FIG. 2B shows that the elements of the lens system 210 may be arranged in groups: a first group 261 with positive refractive power consisting of a refractive lens element 201 and a folding element 241; a second group 262 consisting of at least two refractive lens elements (three, in this example), and a third group 263 containing at least one folding element 242. In some embodiments, for example as shown in FIG. 2B, there may be no air gap between lens element 201 and folding element 261 (e.g., a prism). In some embodiments, lens element 201 and folding element 261 may be formed of the same material (e.g., a lightweight polymer or plastic, or glass). In some embodiments, group 263 may consist of a folding element 242 (e.g., a prism) with no refractive power, for example as illustrated in FIG. 2B. Alternatively, in some embodiments, group 263 may consist of a folding element 242 with refractive power. For example, in some embodiments, a refractive lens element may be integrated (no air gap) with a prism element in group 263 as illustrated in FIGS. 10 through 12. In embodiments where group 263 contains more than one element that are integrated (no air gap between the elements), the elements in the group may be formed of the same material (e.g., a lightweight polymer or plastic, or glass) or of different materials.

While FIG. 2B and the example embodiments described herein show the first refractive lens element 201 on the first axis and on the object side of the first group 261, in some embodiments the first lens element 201 may instead be located on the second axis and in the second group 262. In these embodiments, the first group 261 consists of folding element 241 and has no refractive power.

Figure 9:
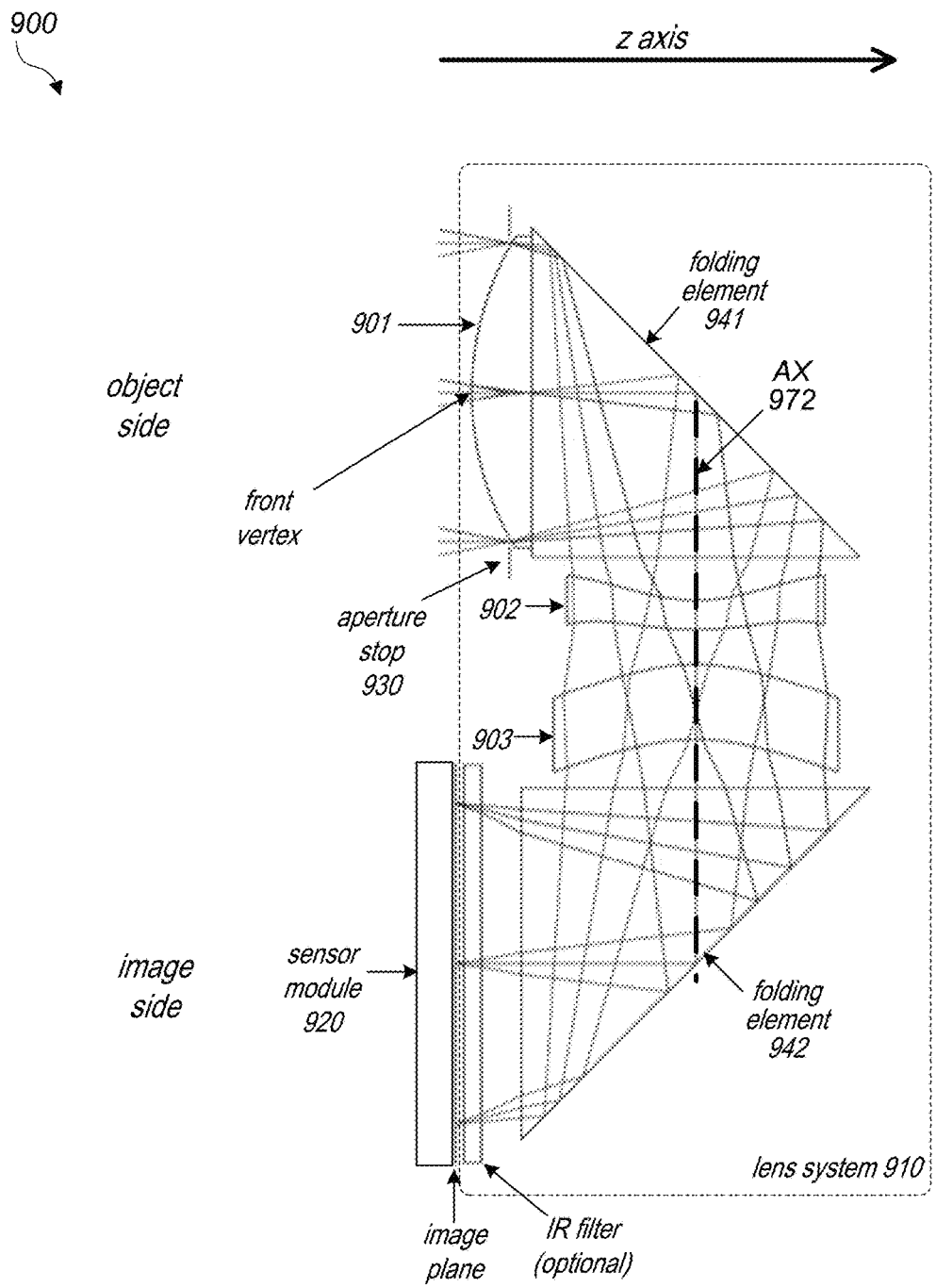

While FIG. 2B and most of the example embodiments described herein show group 263 arranged so that the sensor module 220 is at the back of the camera 200 (with AX 271 substantially parallel to AX 273), in some embodiments group 263 may be rotated around AX 272 to place the sensor module 220 at other positions depending on the design requirements of the camera 200. For example, in some embodiments, group 263 may be rotated 90 degrees clockwise or counterclockwise around AX 272 (with AX 271 substantially perpendicular to AX 273), or group 263 may be rotated 180 degrees around AX 272 to locate sensor module 220 at the front of the camera as illustrated in FIG. 9.

FIGS. 2C further illustrates relationships and characteristics of the optical elements and groups.

FIG. 2C illustrates group 261. In some embodiments, group 261 acts as the main focusing unit for the lens system 210 to collect incoming light through the aperture stop 230. Referring to FIG. 2C, in some embodiments the effective refractive power of group 261 is positive. In some embodiments, group 261 may consist of a positive lens element 201 attached to (i.e., no air gap) a folding element 241 (e.g., a prism). In some embodiments, the positive lens element may have a convex object-side surface in the paraxial region. In some embodiments, group 261 satisfies the condition:

$$f1 > fsys,$$

where f1 is the effective focal length of group 261, and fsys is the effective focal length of the lens system 210. In some embodiments, group 261 satisfies the condition:

$$0.6 < |fsys/f1| < 1.05.$$

In some embodiments, folding element 241 is a prism composed of a material that satisfies the condition:

$$1.5 < Nd < 2.1,$$

where Nd is refractive index of the prism. A relatively high index material for the prism may enable Total Internal Reflection (TIR) from the folding surface.

The paraxial optical path length (OPL) of group 261 (from front vertex to rear vertex along the optical axis) is OPL1 (a1+b1). In some embodiments, group 261 satisfies the condition:

$$0.5 < OPL1/SD < 2$$

where SD is the semi-diagonal image height of the sensor 220. For example, a sensor with a semi-diagonal image height within a range of 2.0 to 2.7 mm may be used; however, larger or smaller sensors may be used with appropriate adjustment of the lens system dimensions.

Group 262 has refractive power. In some embodiments, the magnitude of the effective focal length f2 of group 262 is greater than the effective focal length (fsys) of the lens system 210:

$$|f2| > fsys.$$

In some embodiments, the magnitude of the effective focal length f2 of group 262 is greater than the effective focal length f1 of group 261:

$$|f2| > f1.$$

In some embodiments, the ratio of the effective focal lengths of group 262 and the effective focal length of the lens system 210 satisfies the condition:

$$0.05 < |fsys/f2| < 0.25.$$

In some embodiments, group 262 has relatively weak focusing power to provide a reasonable back-focal length. In some embodiments, aberration control for the lens system 210 may primarily is provided by proper configurations of the lens elements within group 262.

In some embodiments, group 262 consists of at least two refractive lens elements with power. In some embodiments, at least one lens element in group 262 has negative refractive power. In some embodiments, at least one lens element A in group 262 has negative refractive power and is composed of a material for which the Abbe number $Vd_A$ satisfies the condition:

$$Vd_A<30.$$

In some embodiments, at least one lens element B in group 262 is composed of a material for which the Abbe number $Vd_B$ satisfies the condition:

$$Vd_B>50.$$

In some embodiments, group 262 has relatively weak focusing power to provide a reasonable back-focal length, and thus correction of field curvature, astigmatism and chromatic aberrations may be facilitated by power balancing of the lenses in group 262.

In some embodiments, group 263 does not have refractive power. The paraxial optical path length of group 263 (from front vertex to rear vertex along the optical axis) is OPL2 (b2+c2). In some embodiments, group 263 satisfies the condition:

$$0.6<OPL2/SD<2$$

where SD is the semi-diagonal image height of the sensor 220.

Figure 3A:
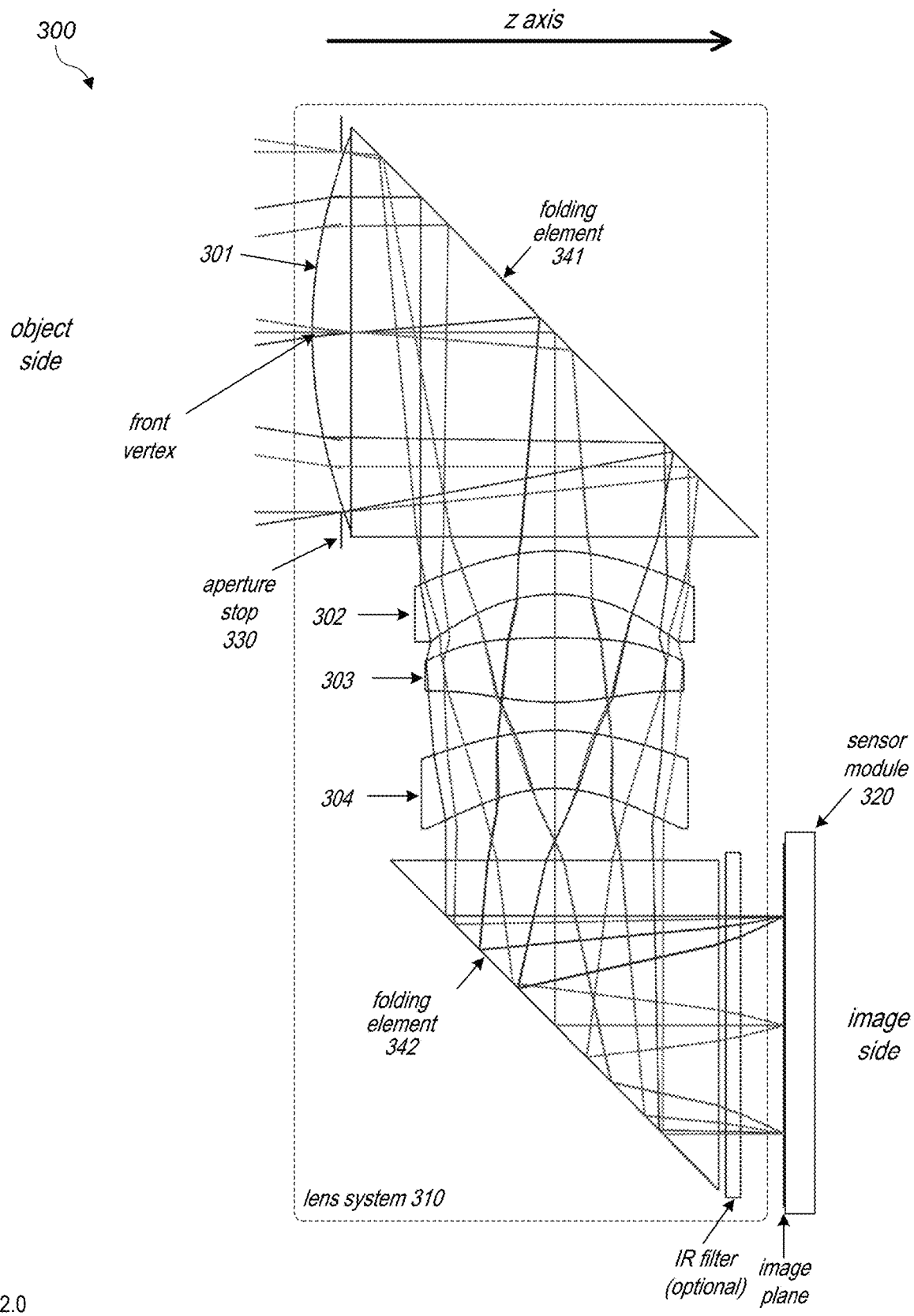
FIG. 3A is a cross-sectional illustration of a first embodiment of a folded lens system with two folding elements.

FIG. 3A is a cross-sectional illustration of a first embodiment of a folded lens system with two folding elements. A camera 300 may include a folded lens system 310 with four refractive lens elements 301-304 and two light folding elements 341 and 342 such as prisms that "fold" the optical axis of the lens system 310. The first folding element 341 folds the optical axis from a first axis that is parallel to the incoming light direction to a second axis that is orthogonal to the incoming light direction. The second folding element 342 folds the optical axis from the second axis to a third axis that is parallel to the incoming light direction.

The camera 300 may also include an aperture stop 330, an optional infrared (IR) filter, and a sensor module 320. Lens system 310 may provide an F-number of 2.0. The 35 millimeter equivalent focal length ($f_{35\ mm}$) of the lens system 310 may be 85 mm.

Lens system 310 includes four lens elements 301-304 with refractive power and two light folding elements 341 and 342 (e.g., prisms), in order from the object side to the image side of the lens system 310: a first lens element 301 with positive refractive power; a first folding element 341 such as a prism; a second lens element 302 with negative refractive power; a third lens element 303 with positive refractive power; a fourth lens element 304 with negative refractive power; and a second light folding element 342 such as a prism. An aperture stop 330 may be located between the object side of the lens system 310 and the folding element 341 for controlling the brightness of the lens system 310. Note that the power order of the refractive lens elements may be different in some embodiments.

Figure 4A:
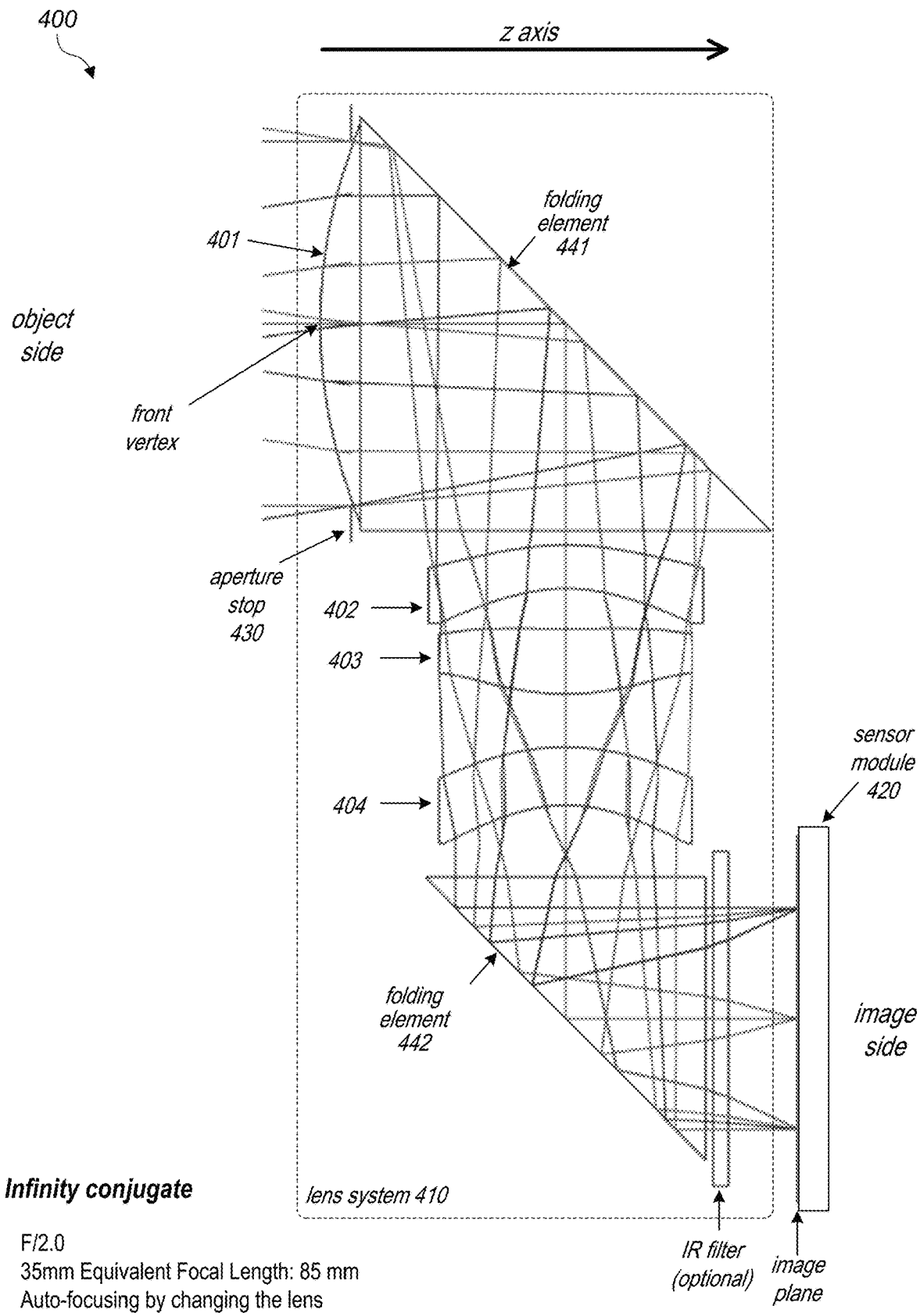
FIG. 4A is a cross-sectional illustration of a second embodiment of a folded lens system with two folding elements at infinity conjugate.
Figure 4B:
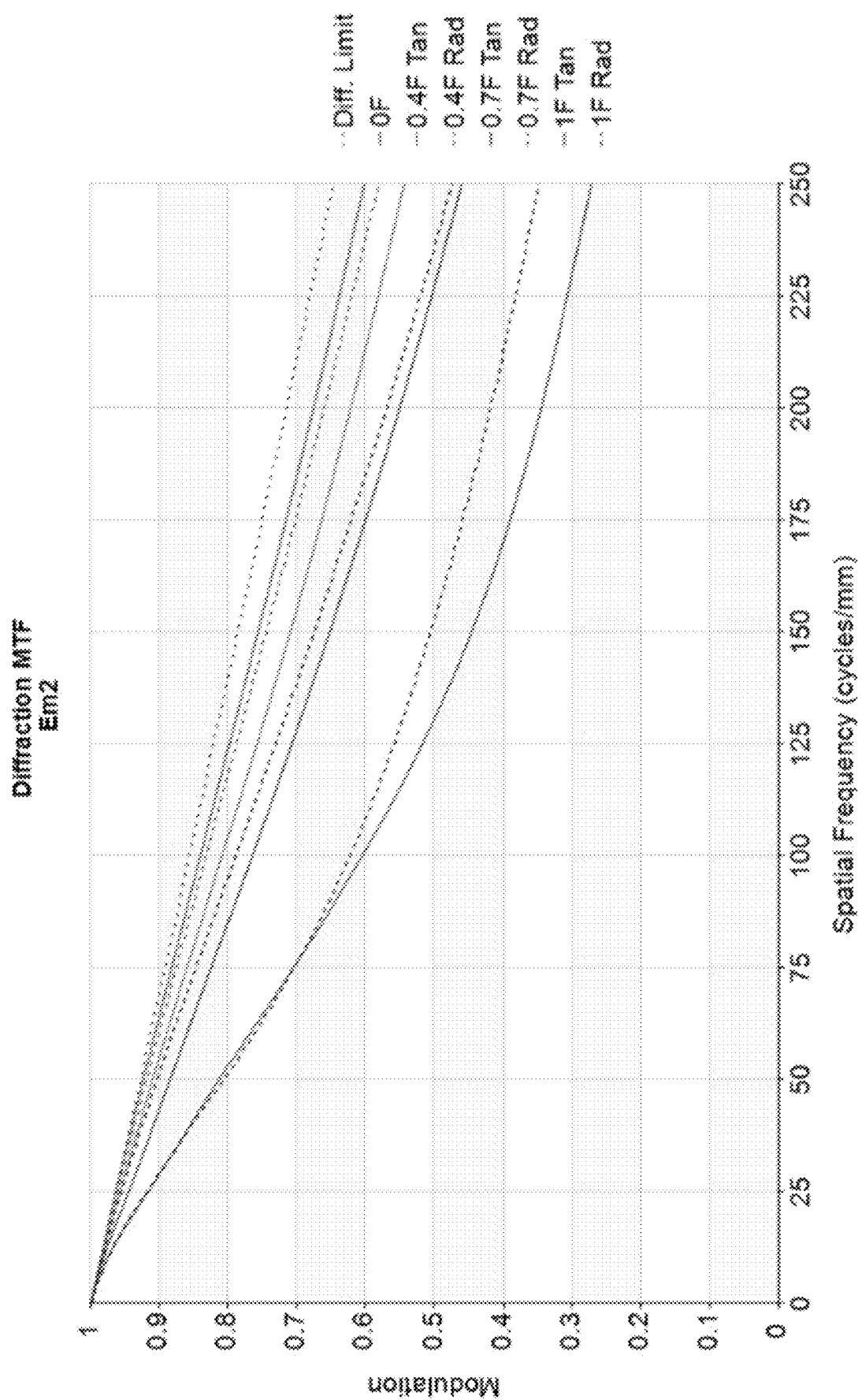
FIG. 4B is a graph illustrating the modulation transfer function (MTF) for a folded lens system as illustrated in FIG. 4A.
Figure 4C:
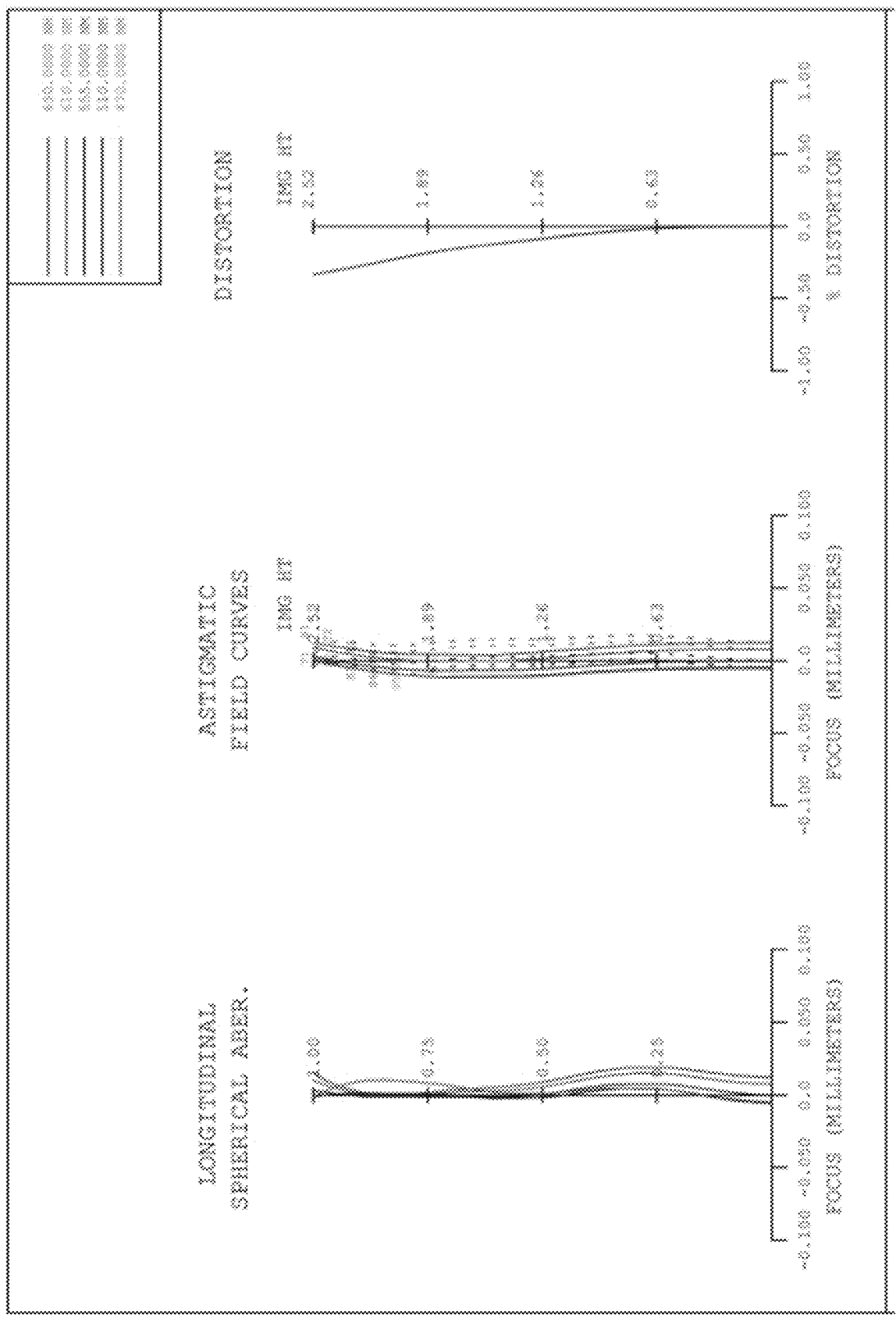
FIG. 4C shows longitudinal spherical aberration, astigmatic field curves, and distortion for a folded lens system as illustrated in FIG. 4A.
Figure 4D:
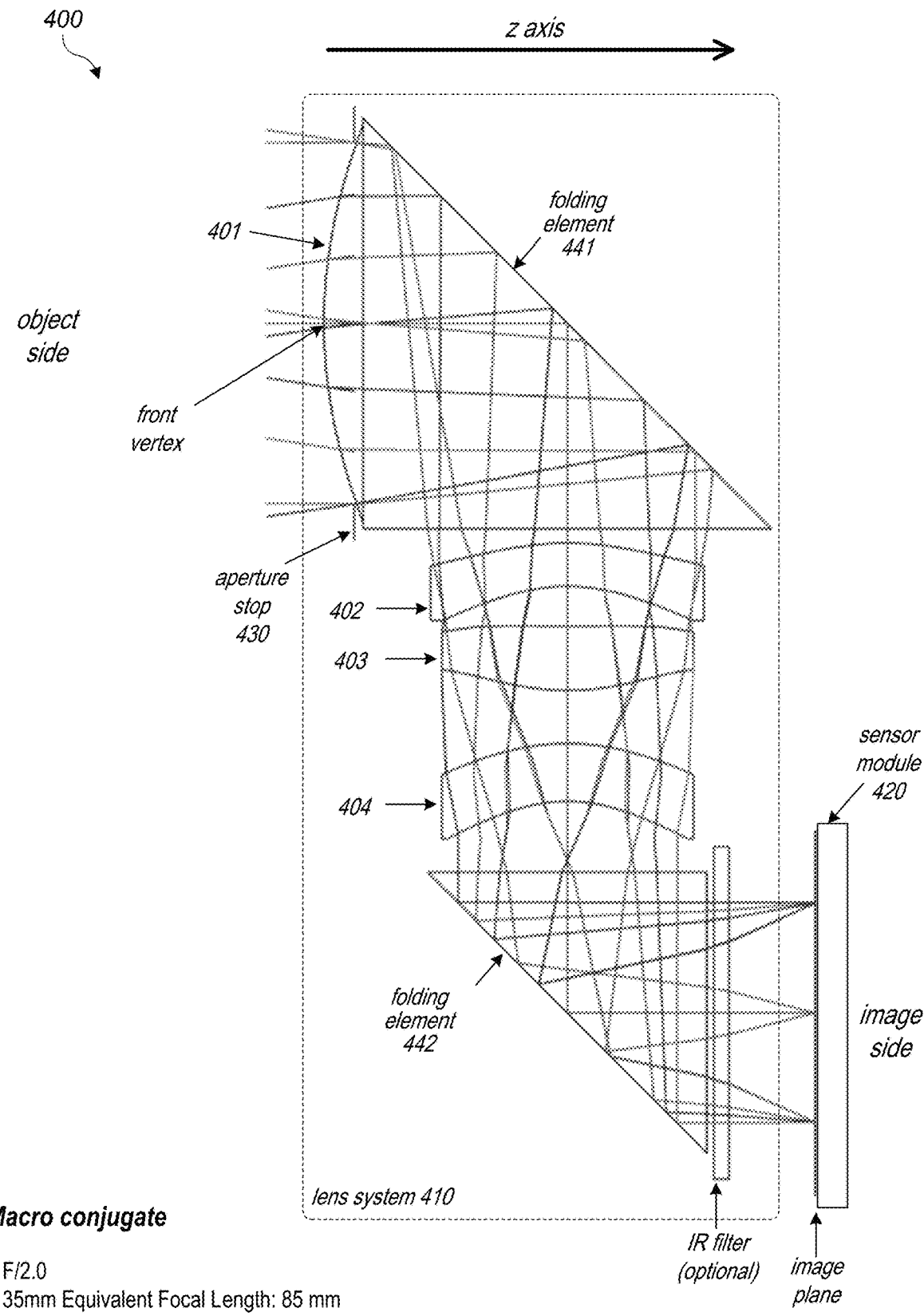
FIG. 4D is a cross-sectional illustration of a second embodiment of a folded lens system with two folding elements at macro conjugate.
Figure 5A:
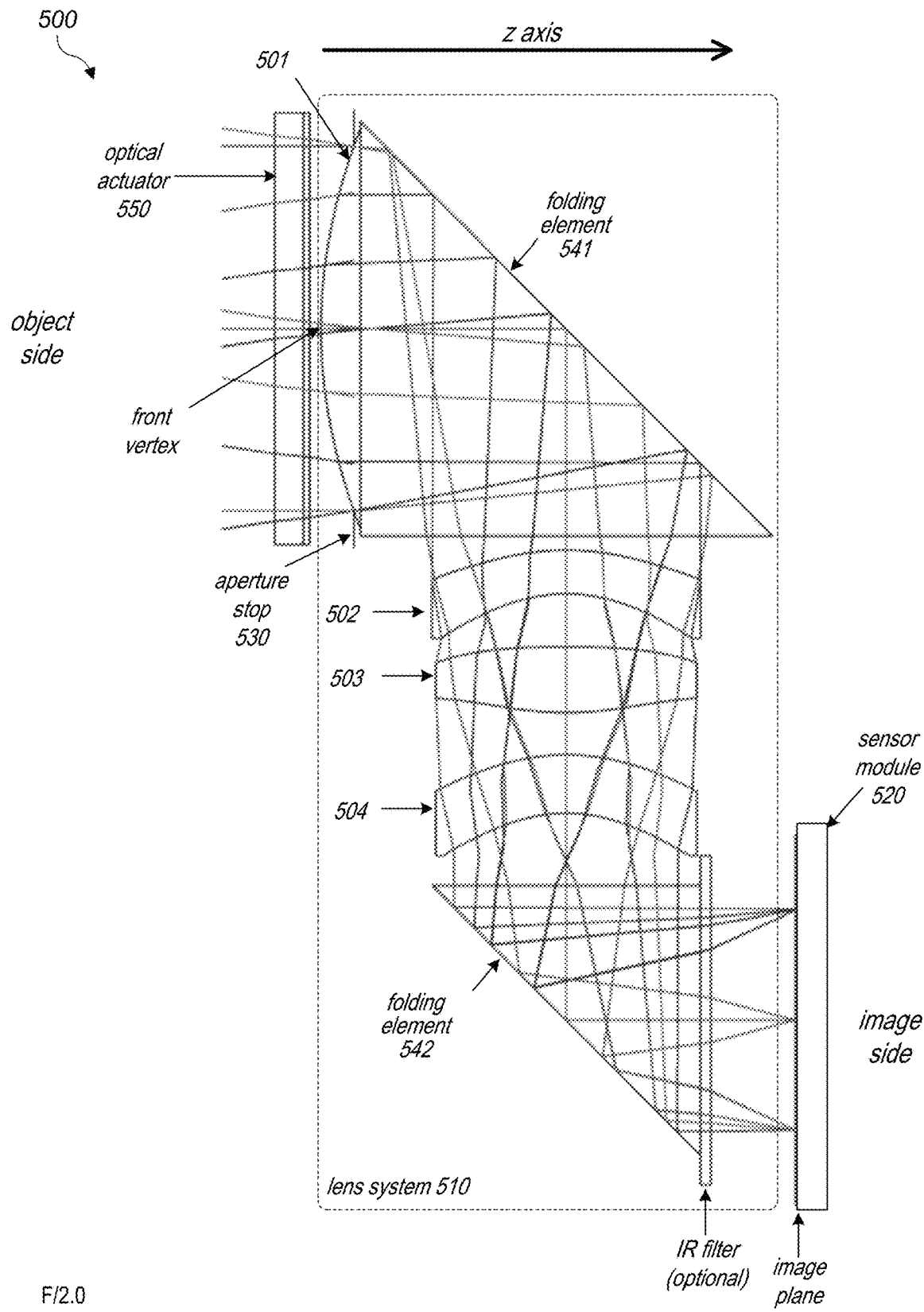
FIG. 5A is a cross-sectional illustration of a third embodiment of a folded lens system with two folding elements that includes an autofocusing actuator.

In some embodiments, the camera 300 includes an IR filter 350, for example located between light folding element 342 and sensor 320, to reduce or eliminate interference of environmental noises on the sensor 320. In some embodiments, the sensor 320 may be shifted relative to the lens system 310 to allow refocusing of the lens system 310 between Infinity conjugate and Macro conjugate, for example as illustrated in FIGS. 4A and 4D. As an alternative, in some embodiments, the camera 300 may include one or more solid-state optical actuator components that provide AF functionality for the camera 300, for example as illustrated in FIG. 5A. In various embodiments, lens elements 301, 302, 303, and/or 304 may be round/circular or rectangular, or some other shape.

Figure 3B:
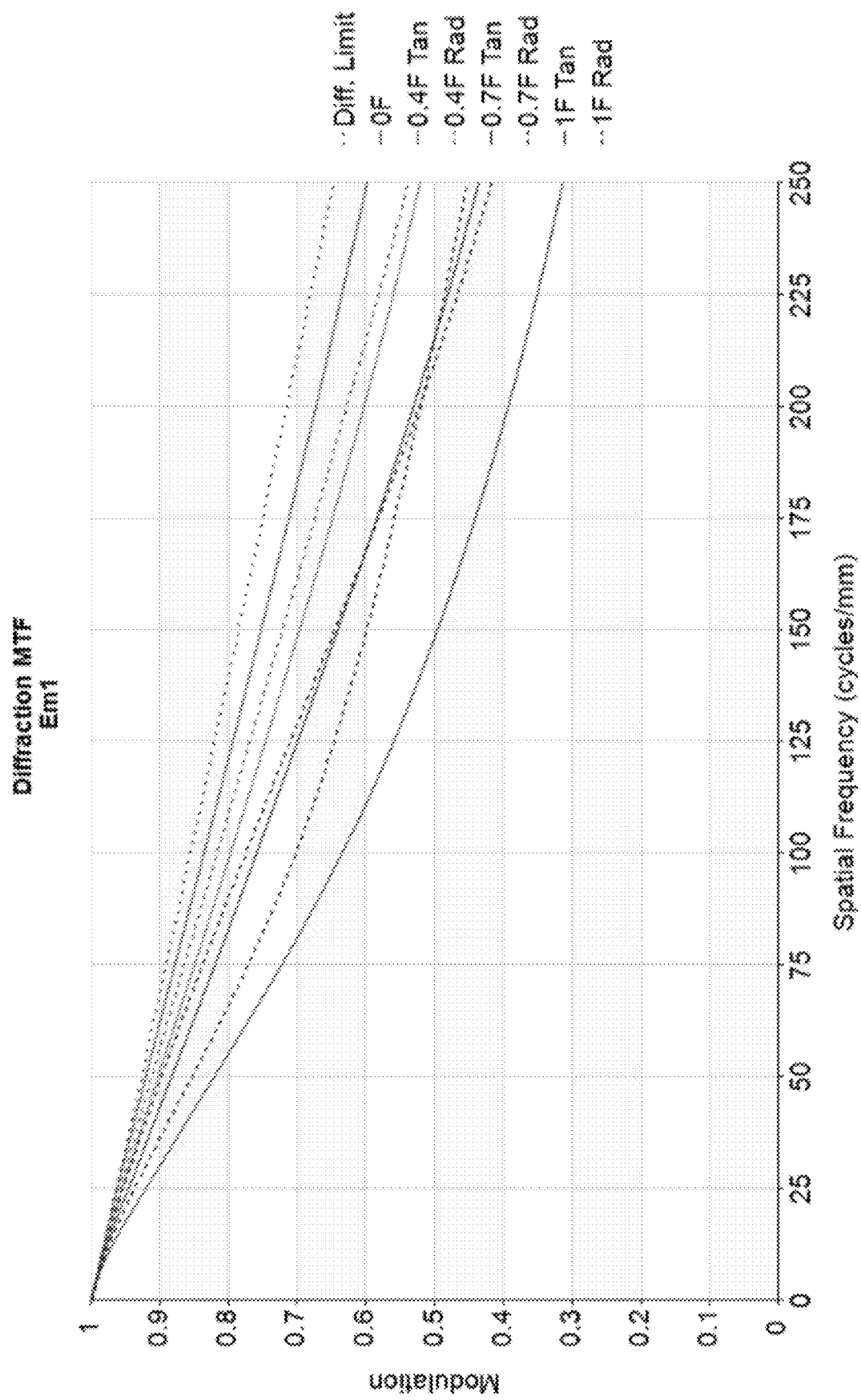
FIG. 3B is a graph illustrating the modulation transfer function (MTF) for a lens system as illustrated in FIG. 3A.
Figure 3C:
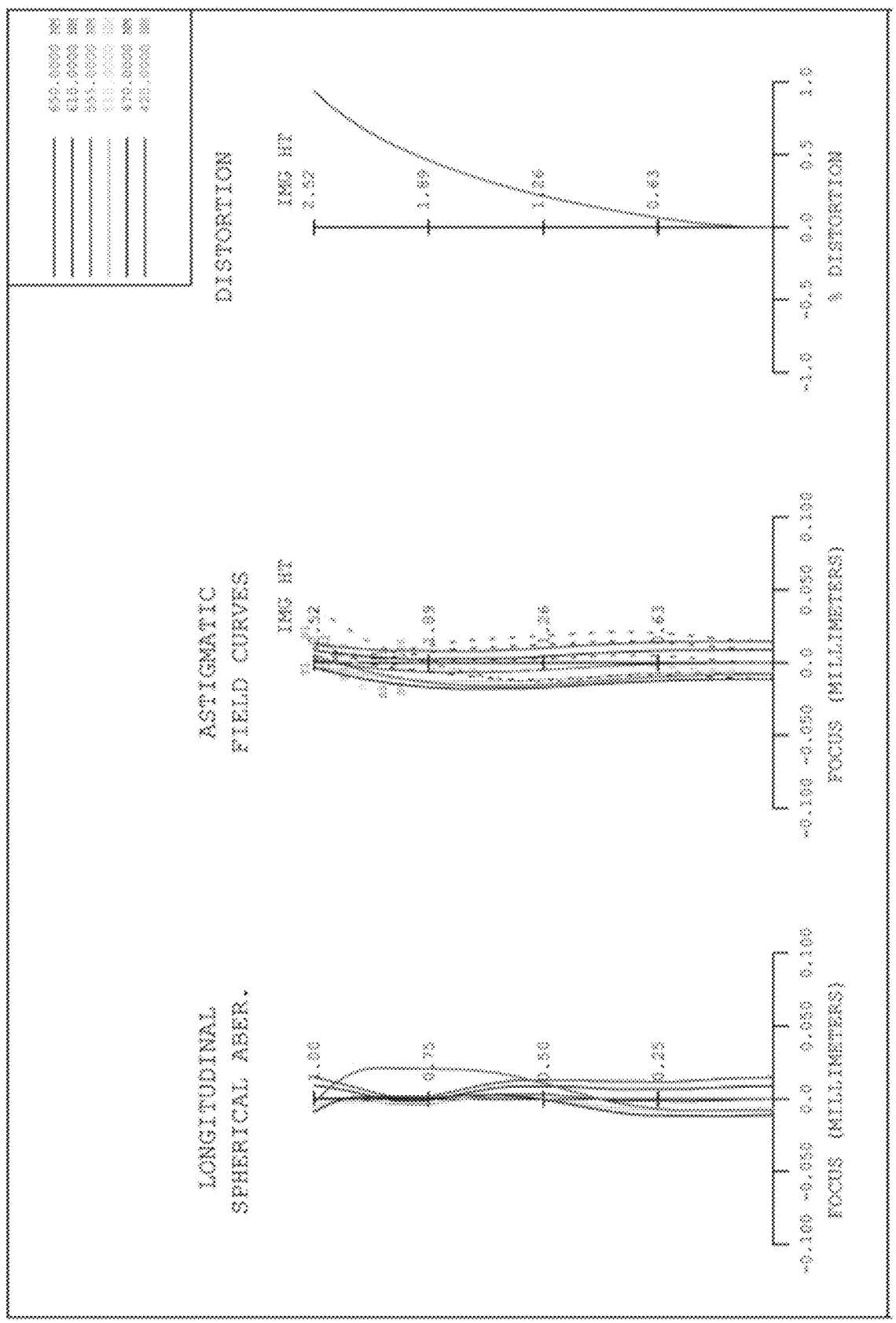
FIG. 3C shows longitudinal spherical aberration, astigmatic field curves, and distortion for a lens system as illustrated in FIG. 3A.

FIG. 3B is a graph illustrating the modulation transfer function (MTF) for a lens system as illustrated in FIG. 3A. FIG. 3C shows longitudinal spherical aberration, astigmatic field curves, and distortion for a lens system as illustrated in FIG. 3A.

FIGS. 4A through 4F illustrate a second embodiment in which the sensor module 420 may be shifted relative to the lens system 410 to allow refocusing of the lens system 410 between Infinity conjugate and Macro conjugate. Lens system 410 is similar to the lens system 310 of FIG. 3A. However, one or more of refractive lenses 401 through 404 and/or folding elements 441 and 442 may be shaped differently, spaced differently, and/or have different optical characteristics than their counterparts in lens system 310. Lens system 410 may provide an F-number of 2.0. The 35 millimeter equivalent focal length ($f_{35\ mm}$) of the lens system 410 may be 85 mm.

FIG. 4A is a cross-sectional illustration of a camera 400 including a lens system 410 in which the sensor 420 is positioned at infinity conjugate. FIG. 4B is a graph illustrating the modulation transfer function (MTF) for a folded lens system 410 at infinity conjugate as illustrated in FIG. 4A. FIG. 4C shows longitudinal spherical aberration, astigmatic field curves, and distortion for a folded lens system 410 at infinity conjugate as illustrated in FIG. 4A.

Figure 4E:
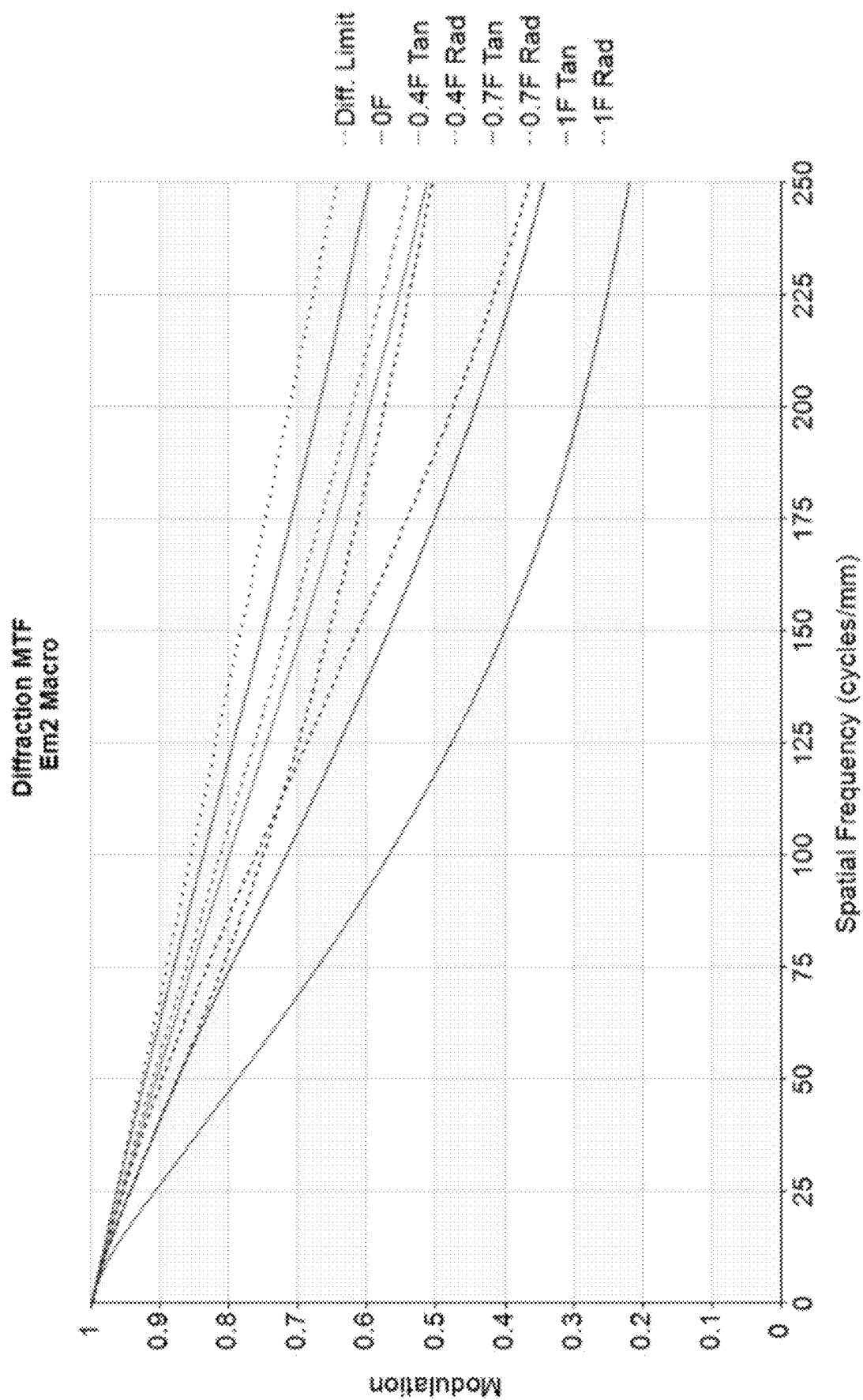
FIG. 4E is a graph illustrating the modulation transfer function (MTF) for a folded lens system as illustrated in FIG. 4D.
Figure 4F:
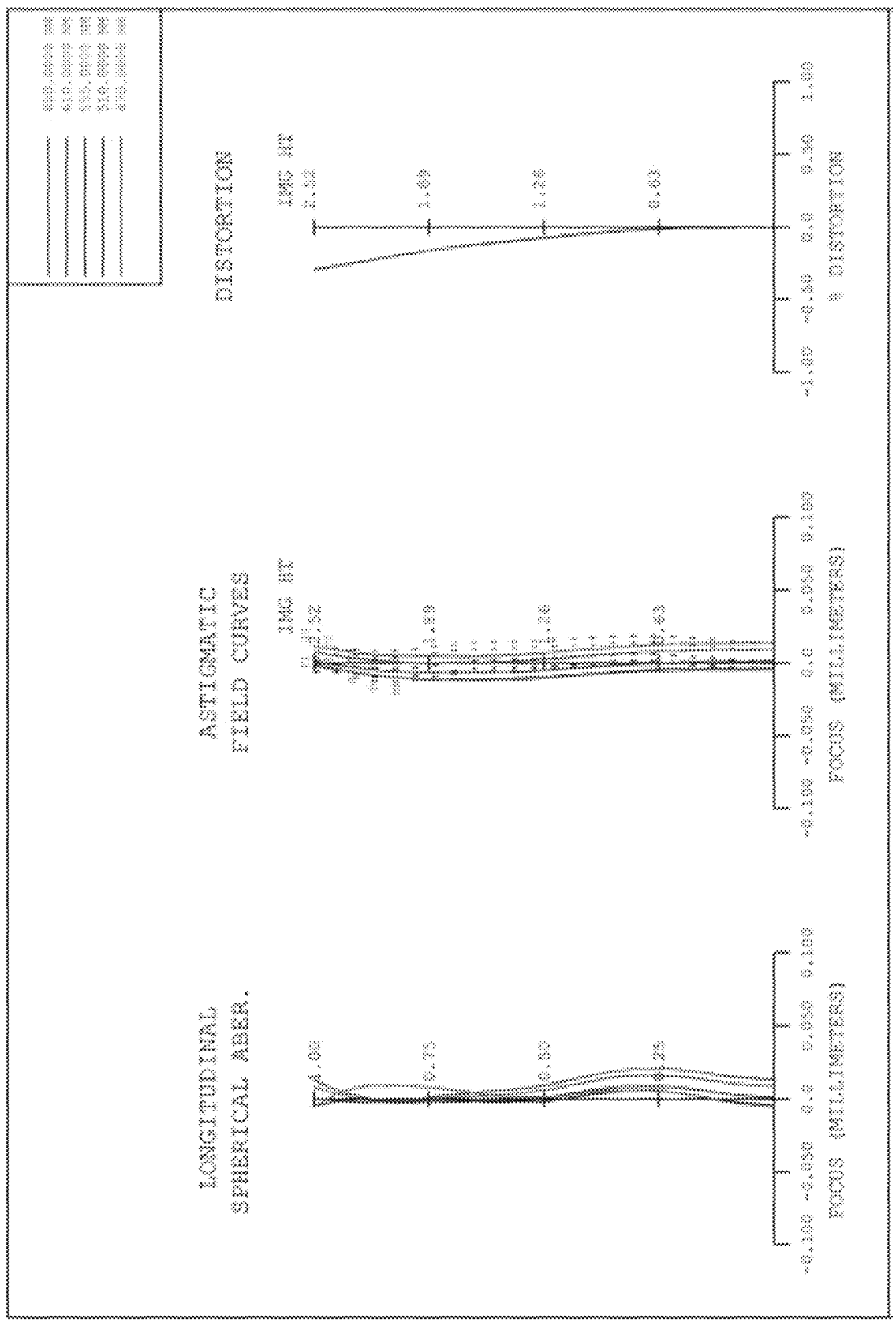
FIG. 4F shows longitudinal spherical aberration, astigmatic field curves, and distortion for a folded lens system as illustrated in FIG. 4D.

FIG. 4D is a cross-sectional illustration of a camera 400 including a lens system 410 in which the sensor 420 is positioned at macro conjugate. FIG. 4E is a graph illustrating the modulation transfer function (MTF) for a folded lens system 410 at macro conjugate as illustrated in FIG. 4D. FIG. 4F shows longitudinal spherical aberration, astigmatic field curves, and distortion for a folded lens system 410 at macro conjugate as illustrated in FIG. 4D.

FIGS. 5A through 5E illustrate a third embodiment that includes an optical actuator 550 to provide refocusing for the lens system 510 between Infinity conjugate and Macro conjugate. Lens system 510 is similar to the lens systems 310 and 410 of FIGS. 3A and 4A. However, one or more of refractive lenses 501 through 504 and/or folding elements 541 and 542 may be shaped differently, spaced differently, and/or have different optical characteristics than their counterparts in lens systems 310 and 410. Lens system 510 may provide an F-number of 2.0. The 35 millimeter equivalent focal length ($f_{35\ mm}$) of the lens system 510 may be 85 mm. As shown, camera 500 includes a solid-state optical actuator 550 positioned in front (on the object side) of the lens system 510 that provides autofocusing functionality for the camera 500.

Figure 5B:
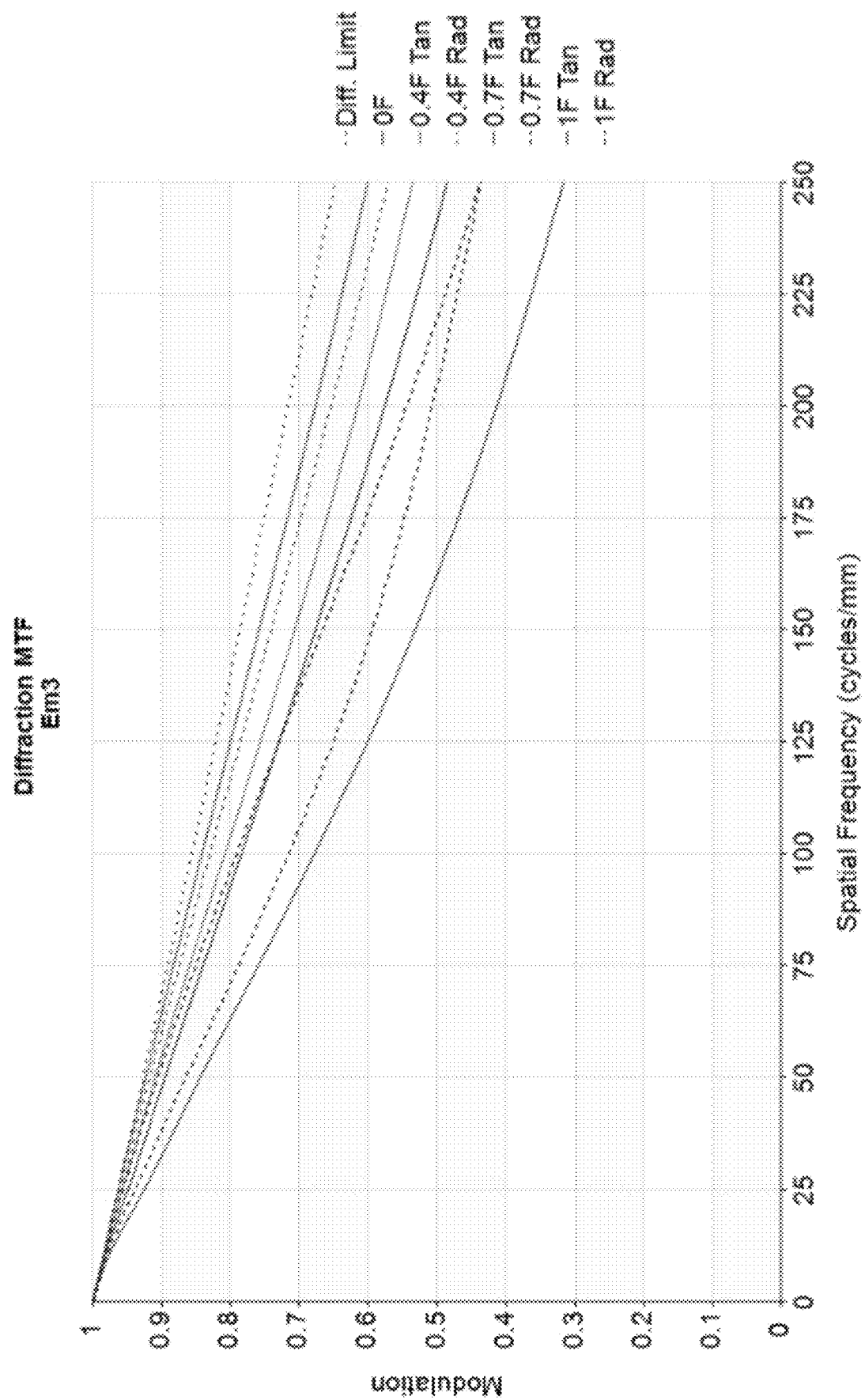
FIG. 5B is a graph illustrating the modulation transfer function (MTF) for a folded lens system as illustrated in FIG. 5A at infinity conjugate.
Figure 5C:
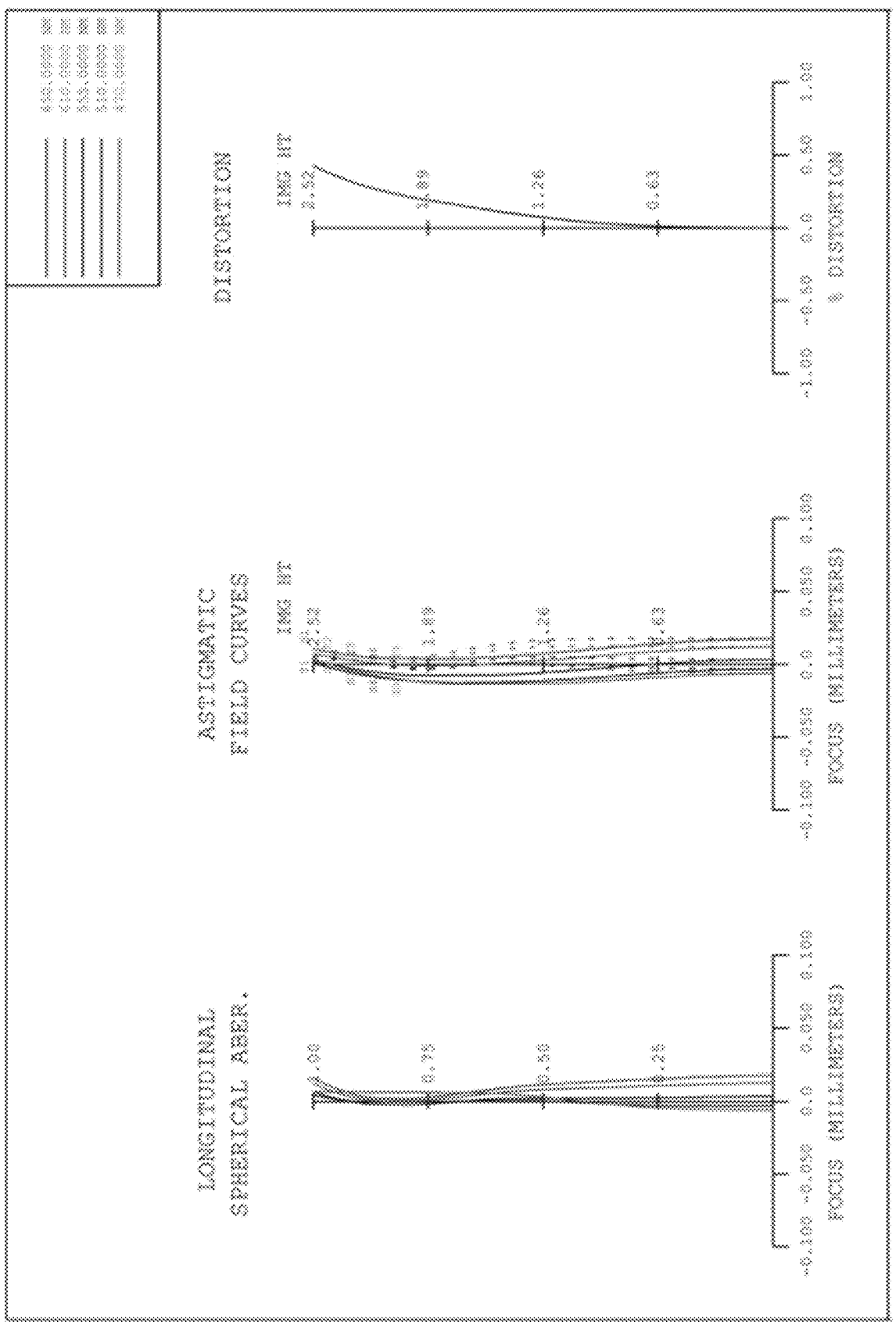
FIG. 5C shows longitudinal spherical aberration, astigmatic field curves, and distortion for a folded lens system as illustrated in FIG. 5A at infinity conjugate.
Figure 5D:
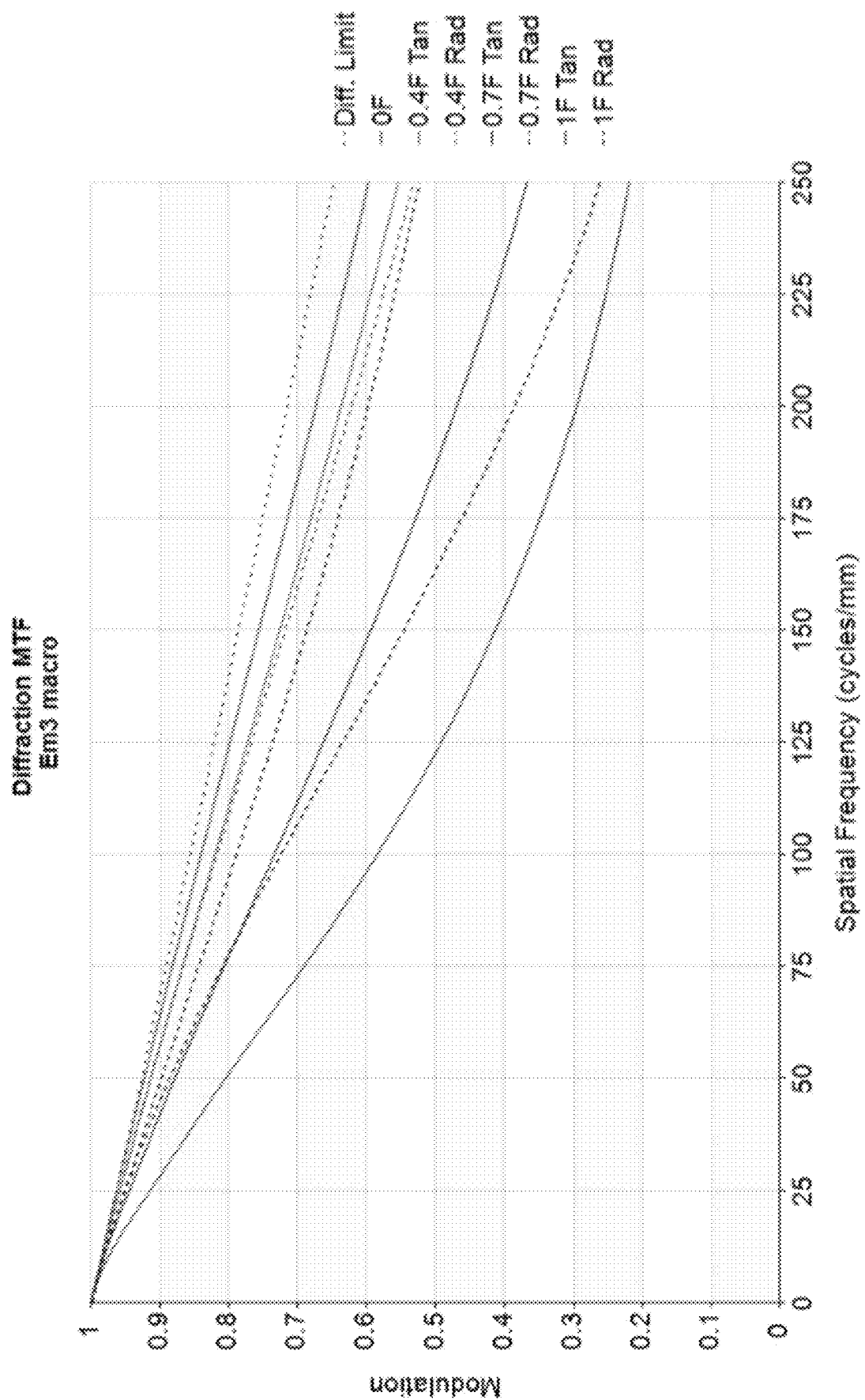
FIG. 5D is a graph illustrating the modulation transfer function (MTF) for a folded lens system as illustrated in FIG. 5A at macro conjugate.
Figure 5E:
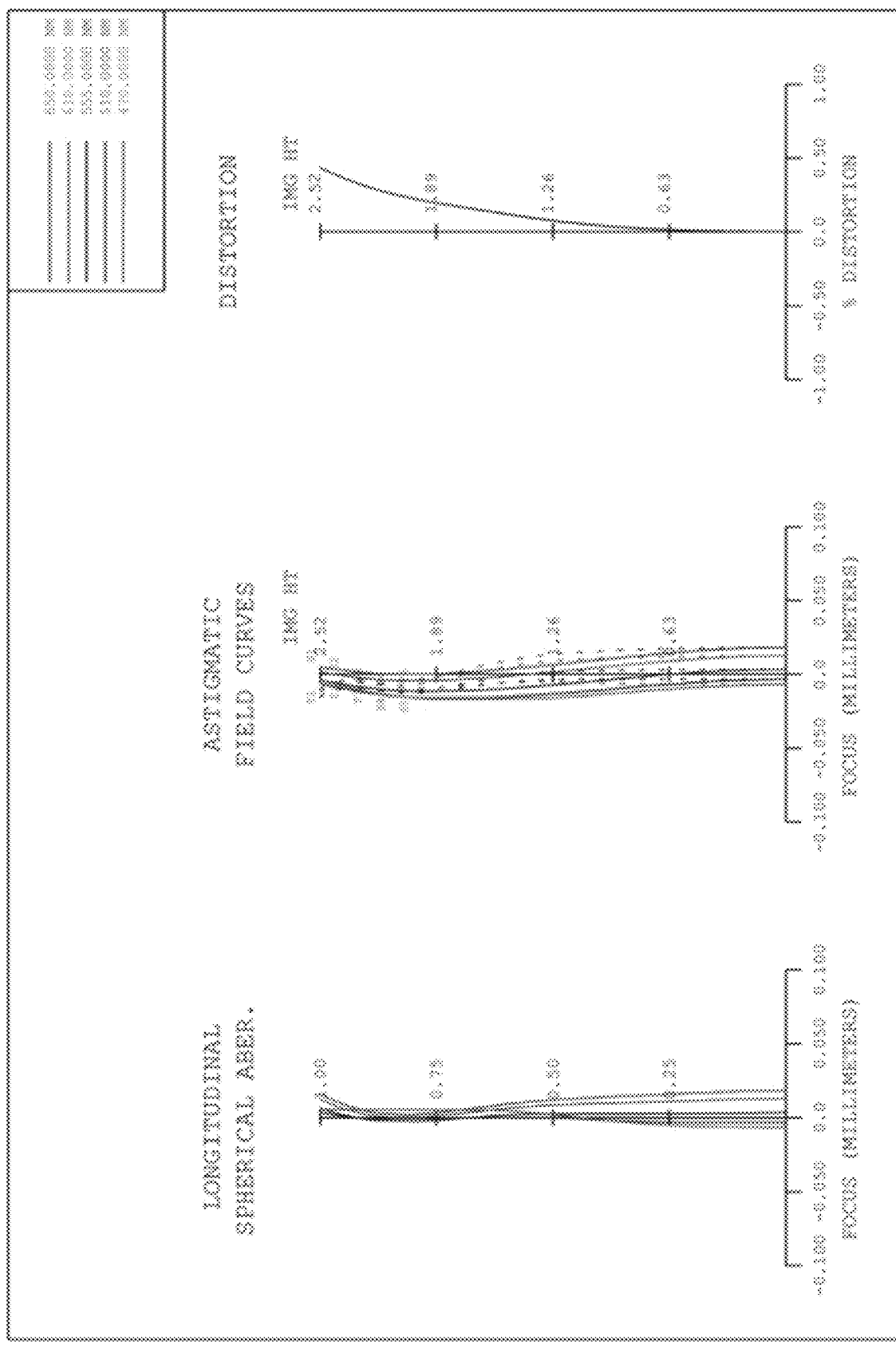
FIG. 5E shows longitudinal spherical aberration, astigmatic field curves, and distortion for a folded lens system as illustrated in FIG. 5A at macro conjugate.

FIG. 5A is a cross-sectional illustration of a camera 500 including a lens system 510 and an autofocusing actuator 550. FIG. 5B is a graph illustrating the modulation transfer function (MTF) for a folded lens system 510 as illustrated in FIG. 5A at infinity conjugate. FIG. 5C shows longitudinal spherical aberration, astigmatic field curves, and distortion for a folded lens system 510 as illustrated in FIG. 5A at infinity conjugate. FIG. 5D is a graph illustrating the modulation transfer function (MTF) for a folded lens system 510 as illustrated in FIG. 5A at macro conjugate. FIG. 5E shows longitudinal spherical aberration, astigmatic field curves, and distortion for a folded lens system 510 as illustrated in FIG. 5A at macro conjugate.

FIGS. 6A through 6F illustrate a fourth embodiment of a folded lens system with two folding elements. A camera 600 may include a folded lens system 610 with three refractive lens elements 601-603 and two light folding elements 641 and 642 such as prisms that "fold" the optical axis of the lens system 610. The first folding element 641 folds the optical axis from a first axis that is parallel to the incoming light direction to a second axis that is orthogonal to the incoming light direction. The second folding element 642 folds the optical axis from the second axis to a third axis that is parallel to the incoming light direction.

Figure 6A:
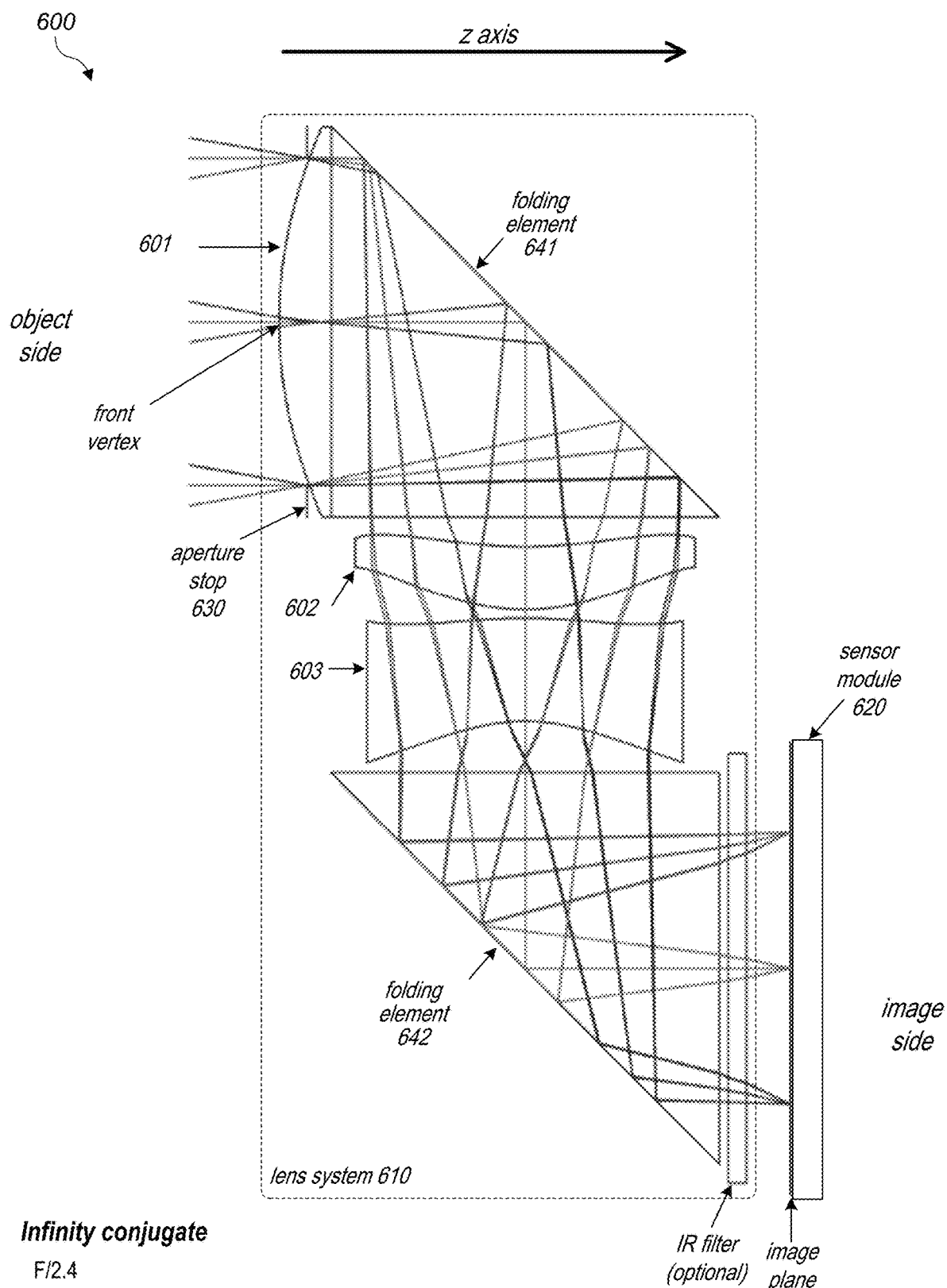
FIG. 6A is a cross-sectional illustration of a fourth embodiment of a folded lens system with two folding elements at infinity conjugate.
Figure 6B:
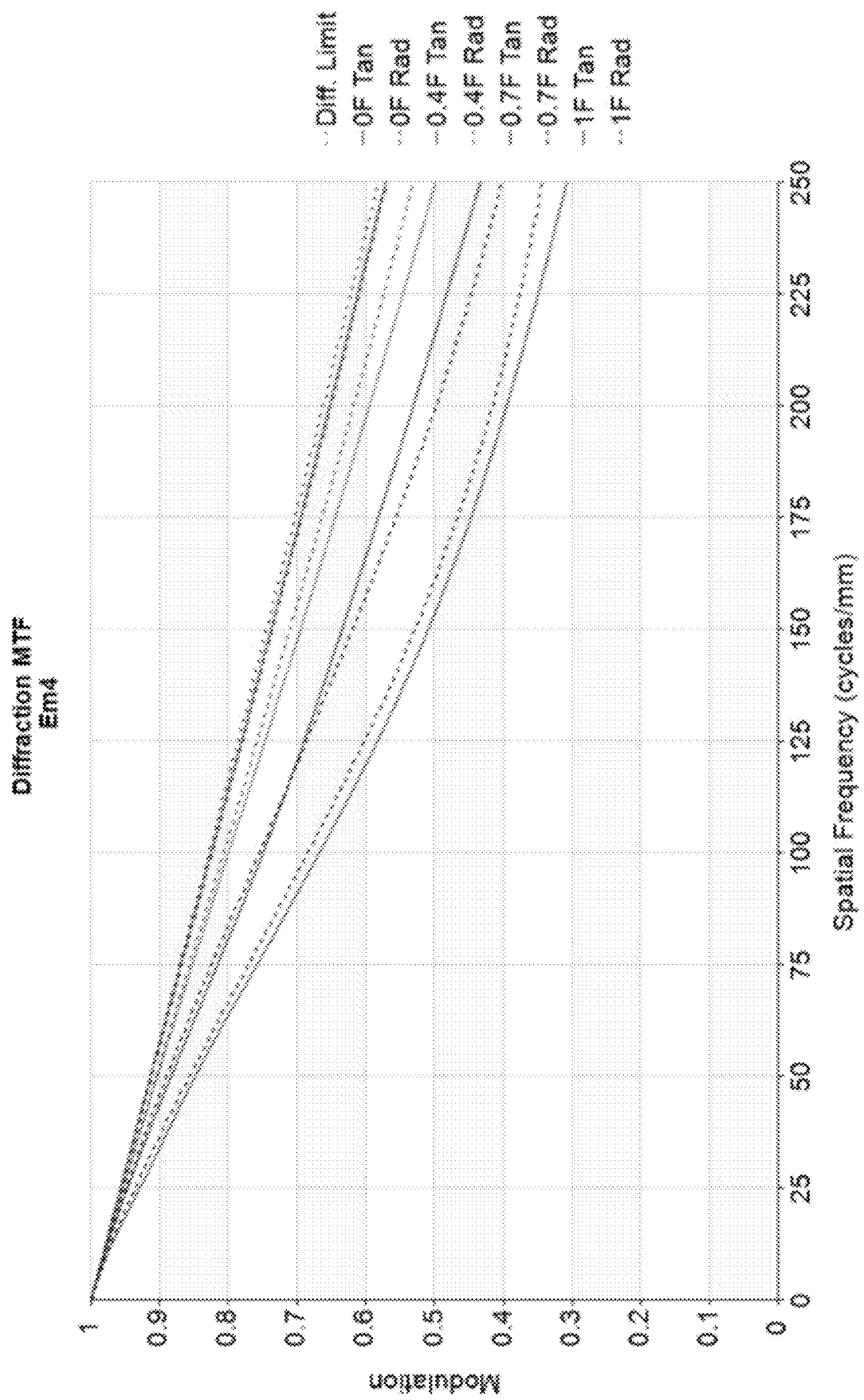
FIG. 6B is a graph illustrating the modulation transfer function (MTF) for a folded lens system as illustrated in FIG. 6A.
Figure 6C:
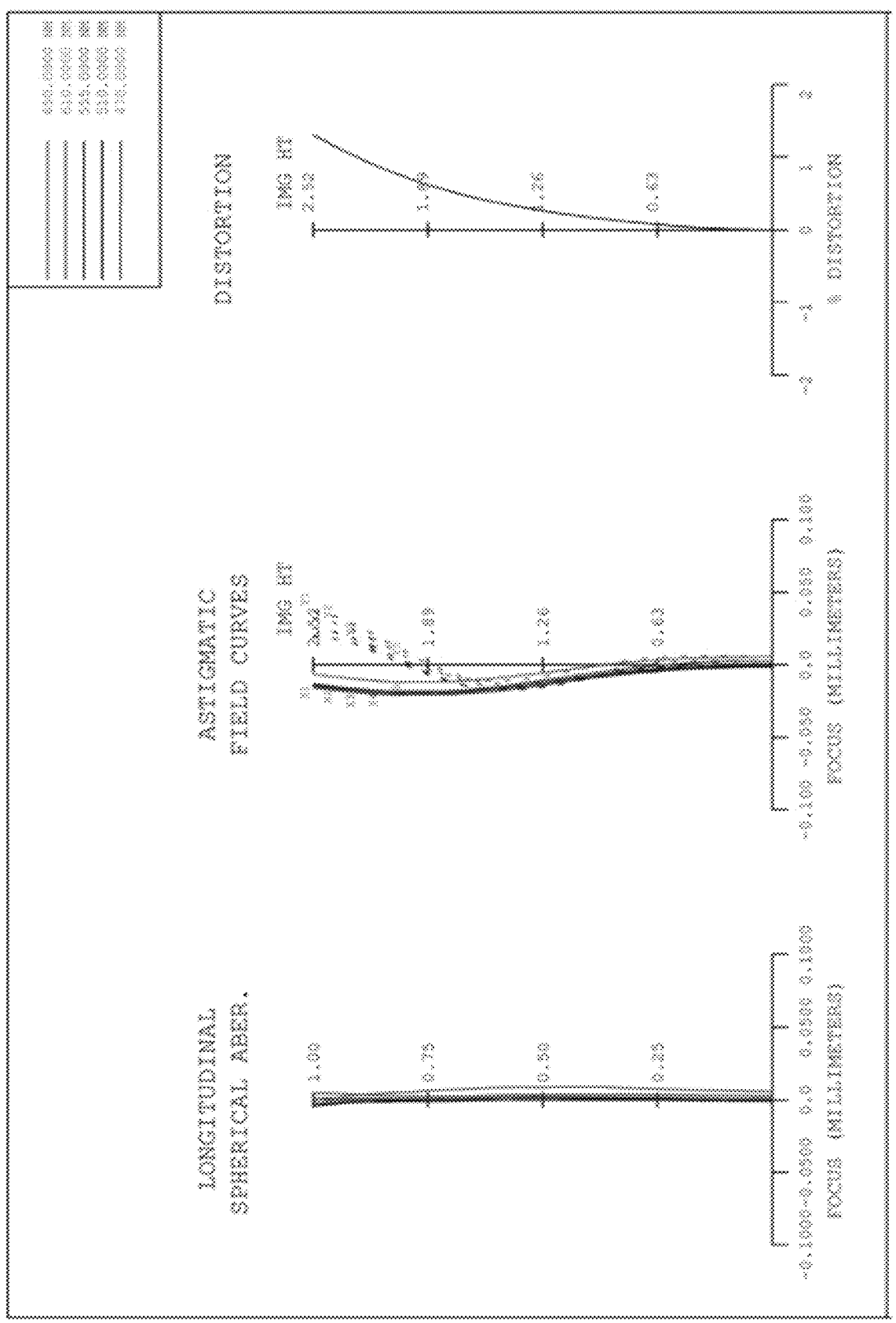
FIG. 6C shows longitudinal spherical aberration, astigmatic field curves, and distortion for a folded lens system as illustrated in FIG. 6A.
Figure 6D:
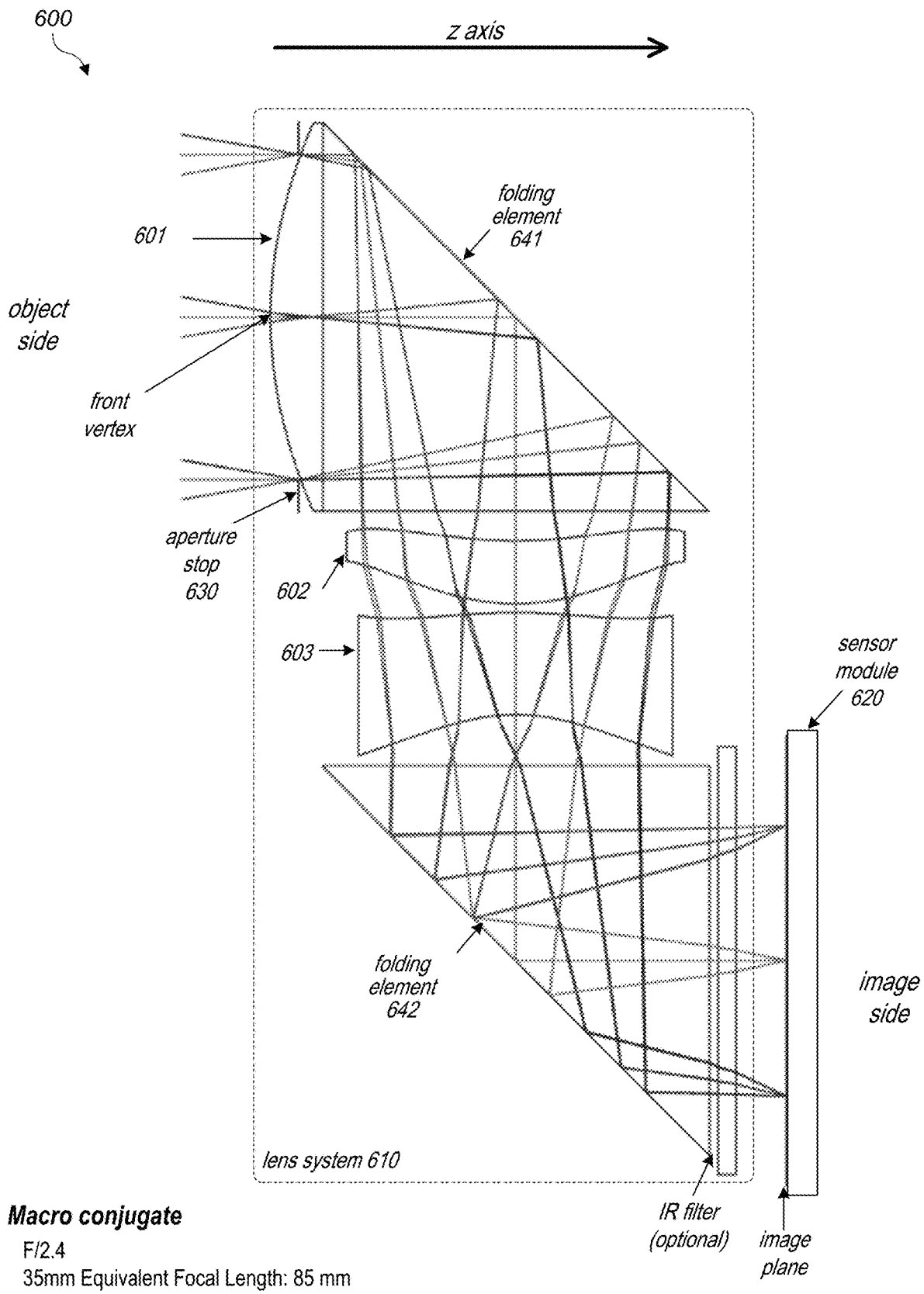
FIG. 6D is a cross-sectional illustration of a second embodiment of a folded lens system with two folding elements at macro conjugate.

The camera 600 may also include an aperture stop 630, an optional infrared (IR) filter, and a sensor module 620. The sensor module 620 may be shifted relative to the lens system 610 to allow refocusing of the lens system 610 between Infinity conjugate and Macro conjugate as illustrated in FIGS. 6A and 6D. As an alternative, in some embodiments, the camera 600 may include one or more solid-state optical actuator components that provide AF functionality for the camera 600. Lens system 610 may provide an F-number of 2.4. The 35 millimeter equivalent focal length ($f_{35\ mm}$) of the lens system 610 may be 85 mm.

Lens system 610 includes three lens elements 601-603 with refractive power and two light folding elements 641 and 642 (e.g., prisms), in order from the object side to the image side of the lens system 610: a first lens element 601 with positive refractive power; a first folding element 341 such as a prism; a second lens element 602 with positive refractive power; a third lens element 603 with negative refractive power; and a second light folding element 642 such as a prism. An aperture stop 630 may be located between the object side of the lens system 610 and the folding element 641 for controlling the brightness of the lens system 610. Note that the power order of the refractive lens elements may be different in some embodiments.

In some embodiments, the camera 600 includes an IR filter 650, for example located between light folding element 642 and sensor 620, to reduce or eliminate interference of environmental noises on the sensor 620. In some embodiments, the sensor 620 may be shifted relative to the lens system 610 to allow refocusing of the lens system 610 between Infinity conjugate and Macro conjugate, for example as illustrated in FIGS. 6A and 6D. As an alternative, in some embodiments, the camera 600 may include one or more solid-state optical actuator components that provide AF functionality for the camera 600. In various embodiments, lens elements 601, 602, and/or 603 may be round/circular or rectangular, or some other shape.

FIG. 6A is a cross-sectional illustration of a camera 600 including a lens system 610 in which the sensor 620 is positioned at infinity conjugate. FIG. 6B is a graph illustrating the modulation transfer function (MTF) for a folded lens system as illustrated in FIG. 6A. FIG. 6C shows longitudinal spherical aberration, astigmatic field curves, and distortion for a folded lens system as illustrated in FIG. 6A.

Figure 6E:
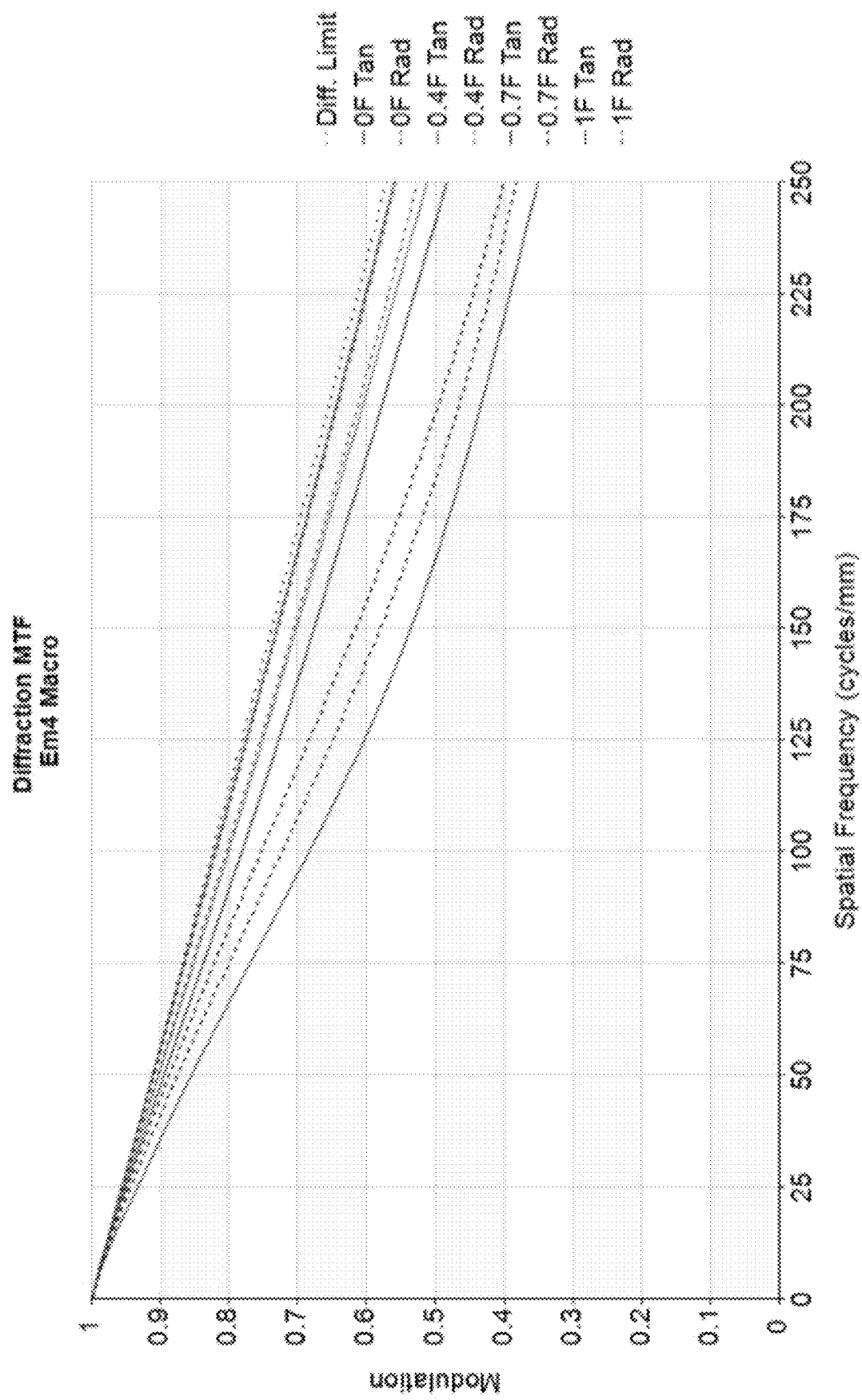
FIG. 6E is a graph illustrating the modulation transfer function (MTF) for a folded lens system as illustrated in FIG. 6D.
Figure 6F:
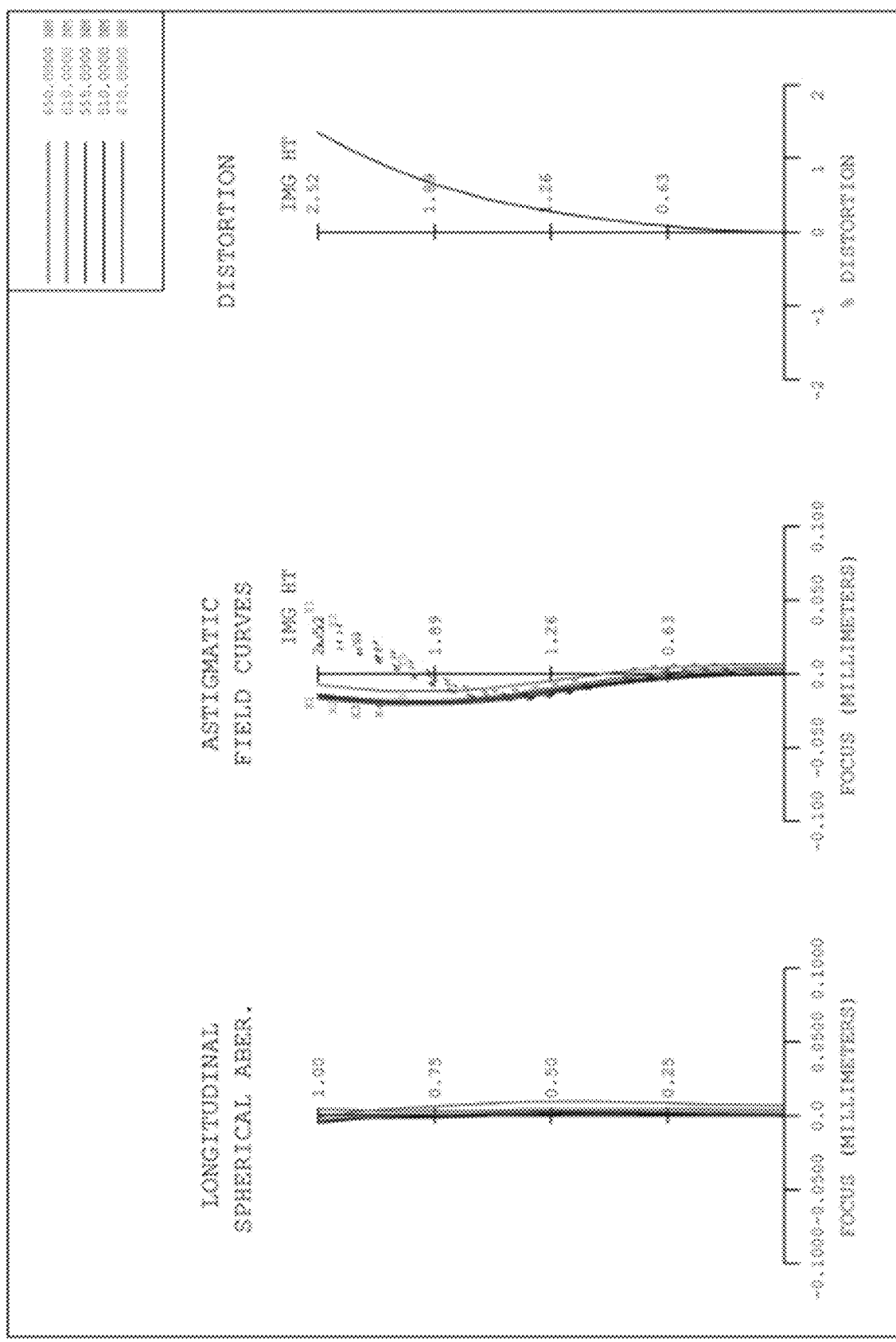
FIG. 6F shows longitudinal spherical aberration, astigmatic field curves, and distortion for a folded lens system as illustrated in FIG. 6D.

FIG. 6D is a cross-sectional illustration of a camera 600 including a lens system 610 in which the sensor 620 is positioned at macro conjugate. FIG. 6E is a graph illustrating the modulation transfer function (MTF) for a folded lens system as illustrated in FIG. 6D. FIG. 6F shows longitudinal spherical aberration, astigmatic field curves, and distortion for a folded lens system as illustrated in FIG. 6D.

FIGS. 7A through 7E illustrate a fifth embodiment that includes two optical actuators 751 and 752 to provide refocusing for the lens system 710 between Infinity conjugate and Macro conjugate. Lens system 710 is similar to the lens systems 310, 410, and 510 of FIGS. 3A, 4A, and 5A. However, one or more of refractive lenses 701 through 704 and/or folding elements 741 and 742 may be shaped differently, spaced differently, and/or have different optical characteristics than their counterparts in lens systems 310, 410, and 510. Lens system 710 may provide an F-number of 2.2.

The 35 millimeter equivalent focal length ($f_{35\ mm}$) of the lens system 710 may be 85 mm. As shown, camera 700 includes two solid-state optical actuators 751 and 752 which provide autofocusing functionality for the camera 700, with actuator 751 positioned in front (on the object side) of the lens system 710, and actuator 752 positioned between lens 704 and folding element 742.

Figure 7A:
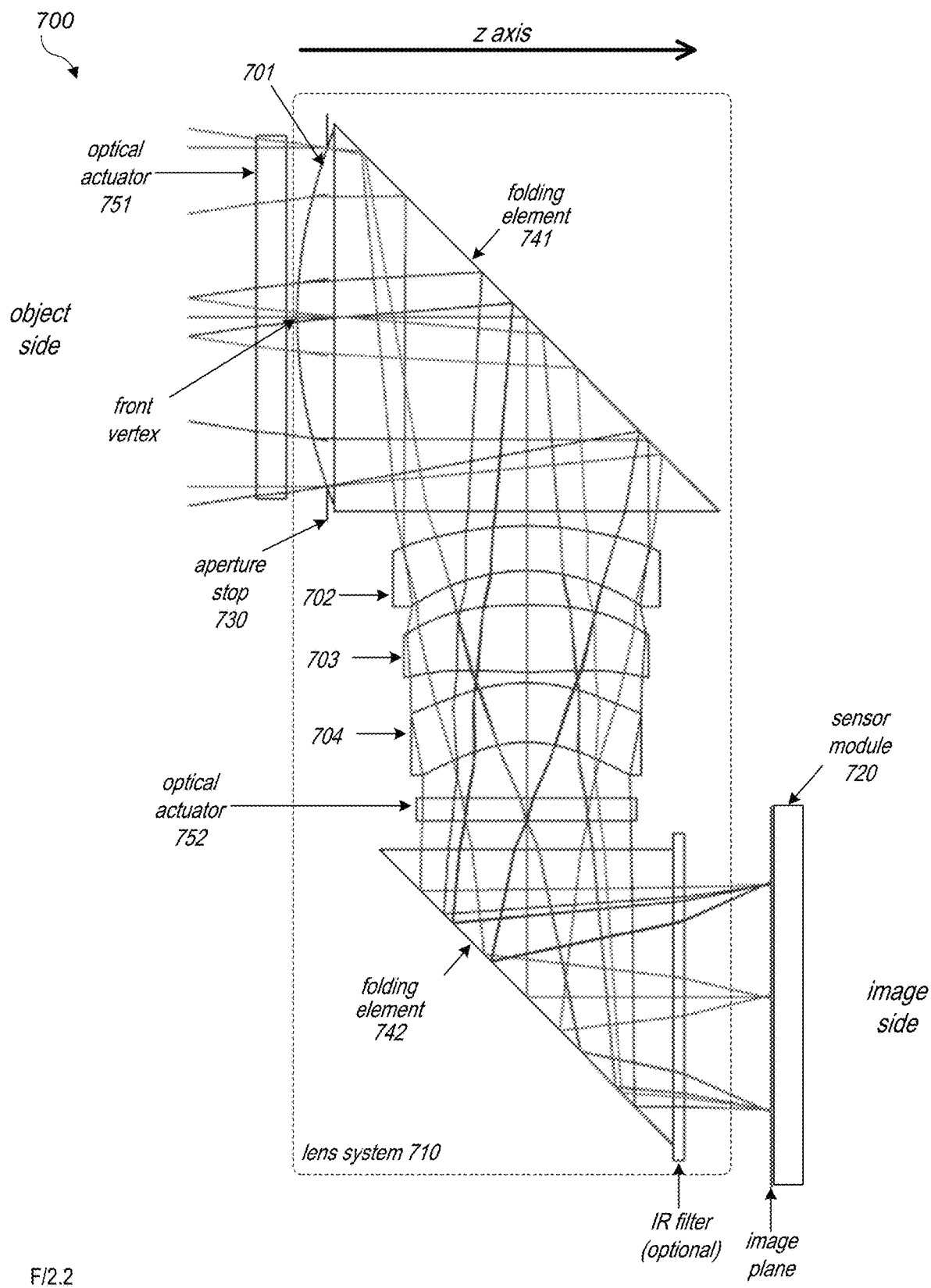
FIG. 7A is a cross-sectional illustration of a fifth embodiment of a folded lens system with two folding elements that includes two autofocusing actuators.
Figure 7B:
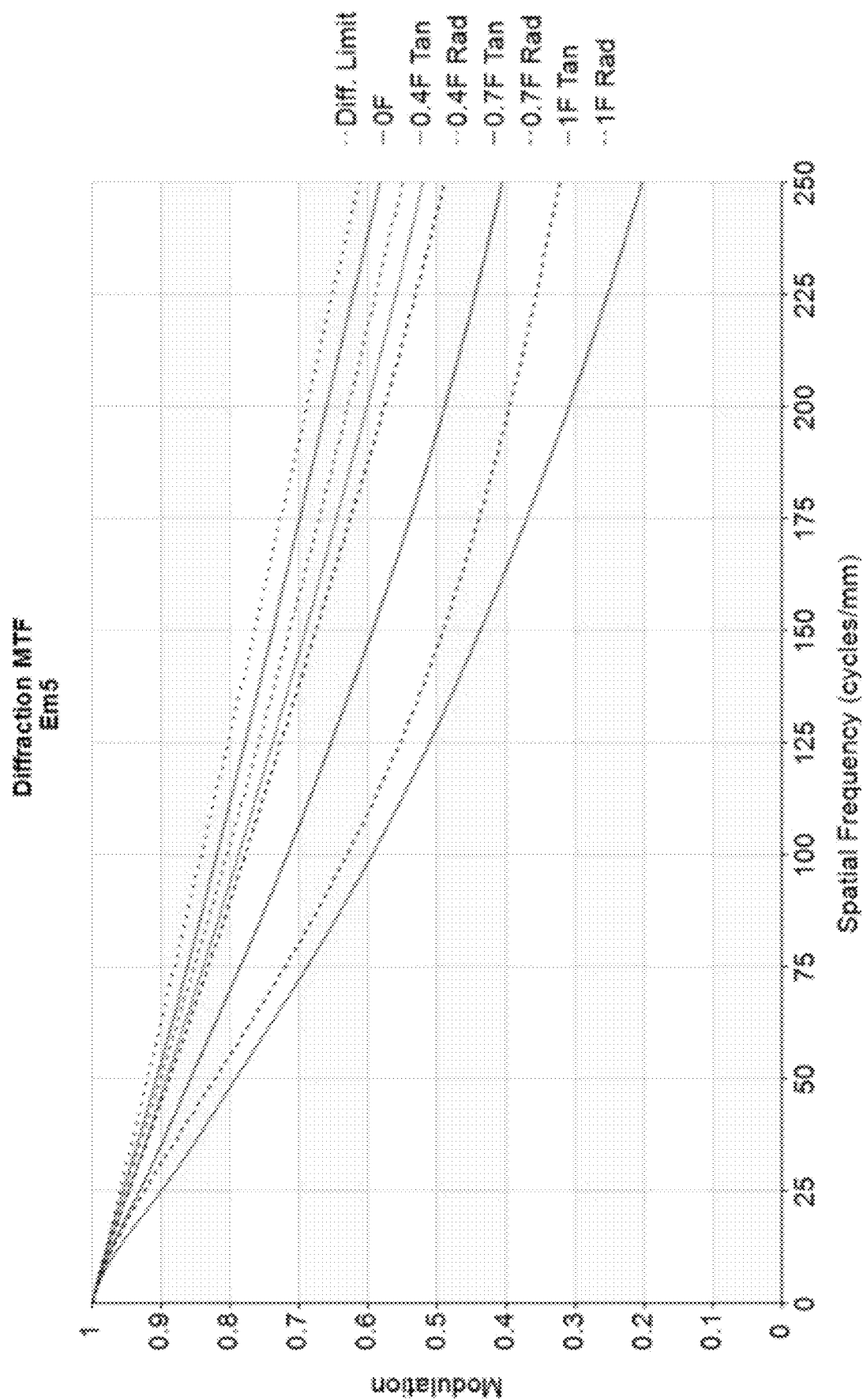
FIG. 7B is a graph illustrating the modulation transfer function (MTF) for a folded lens system as illustrated in FIG. 7A at infinity conjugate.
Figure 7C:
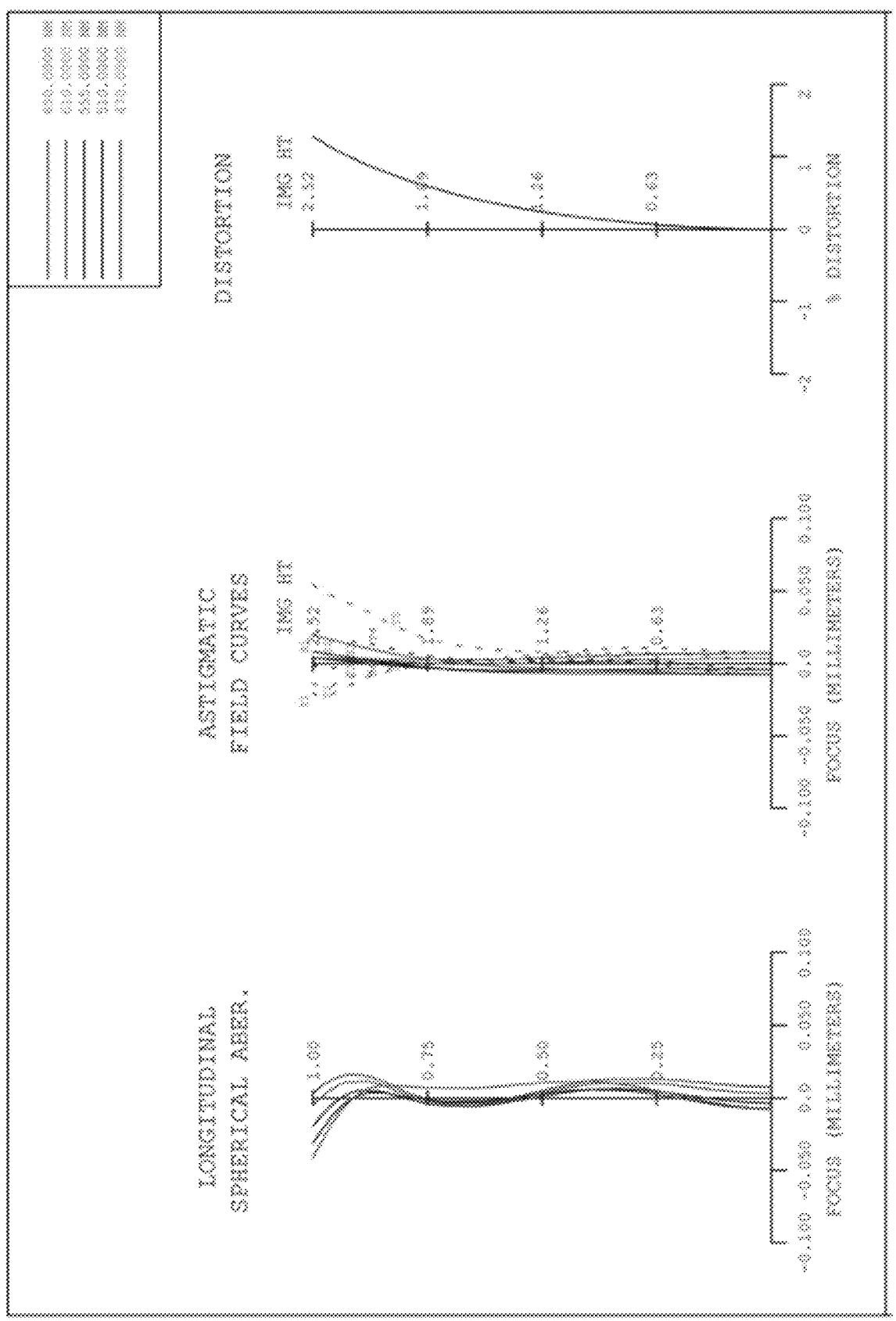
FIG. 7C shows longitudinal spherical aberration, astigmatic field curves, and distortion for a folded lens system as illustrated in FIG. 7A at infinity conjugate.
Figure 7D:
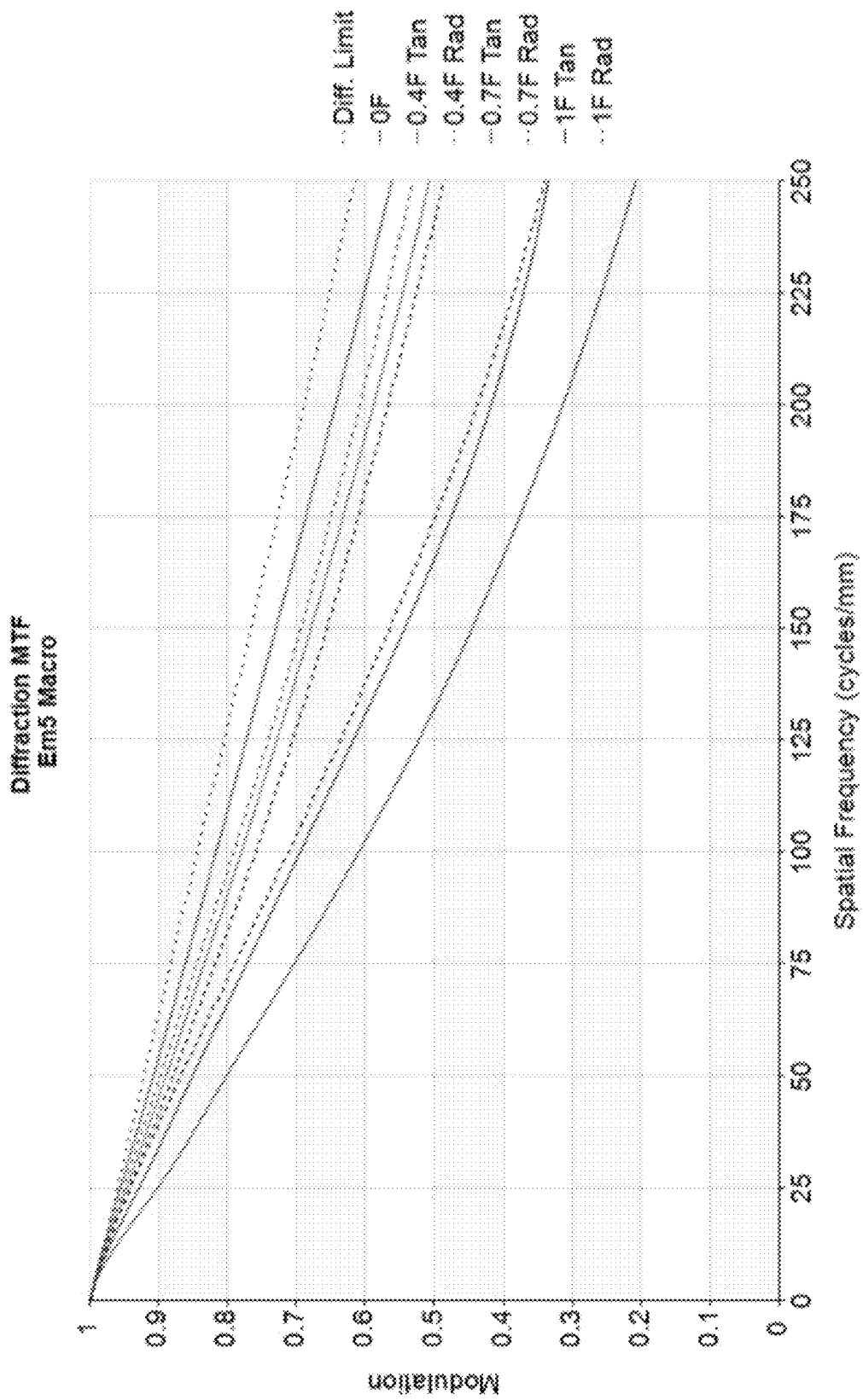
FIG. 7D is a graph illustrating the modulation transfer function (MTF) for a folded lens system as illustrated in FIG. 7A at macro conjugate.
Figure 7E:
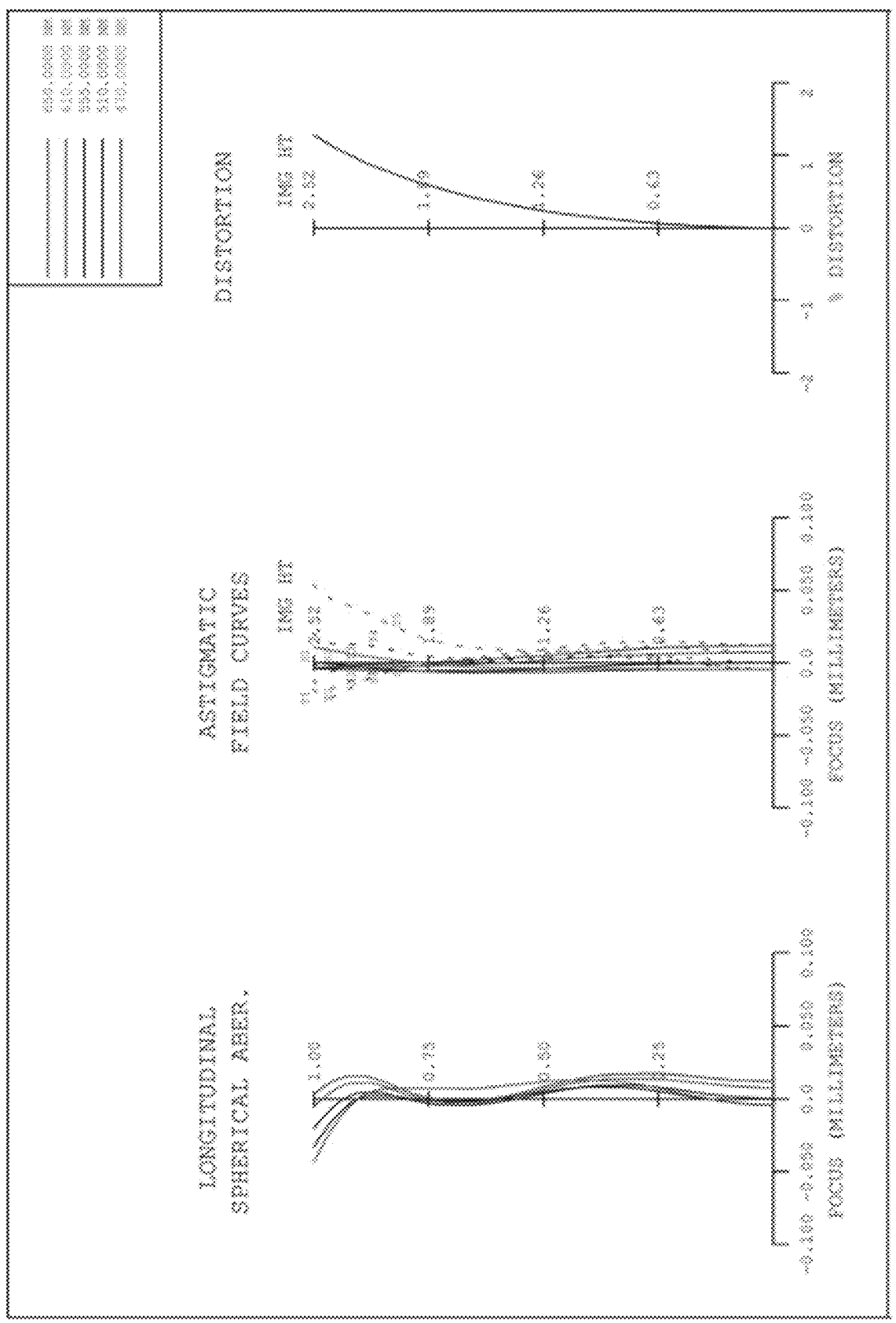
FIG. 7E shows longitudinal spherical aberration, astigmatic field curves, and distortion for a folded lens system as illustrated in FIG. 7A at macro conjugate.

FIG. 7A is a cross-sectional illustration of a camera 700 including a lens system 710 with two autofocusing actuators 751 and 752. FIG. 7B is a graph illustrating the modulation transfer function (MTF) for a folded lens system 710 as illustrated in FIG. 7A at infinity conjugate. FIG. 7C shows longitudinal spherical aberration, astigmatic field curves, and distortion for a folded lens system 710 as illustrated in FIG. 7A at infinity conjugate. FIG. 7D is a graph illustrating the modulation transfer function (MTF) for a folded lens system 710 as illustrated in FIG. 7A at macro conjugate. FIG. 7E shows longitudinal spherical aberration, astigmatic field curves, and distortion for a folded lens system 710 as illustrated in FIG. 7A at macro conjugate.

FIGS. 8 through 12 show example alternative embodiments of a folded lens system with two folding elements.

Figure 8:
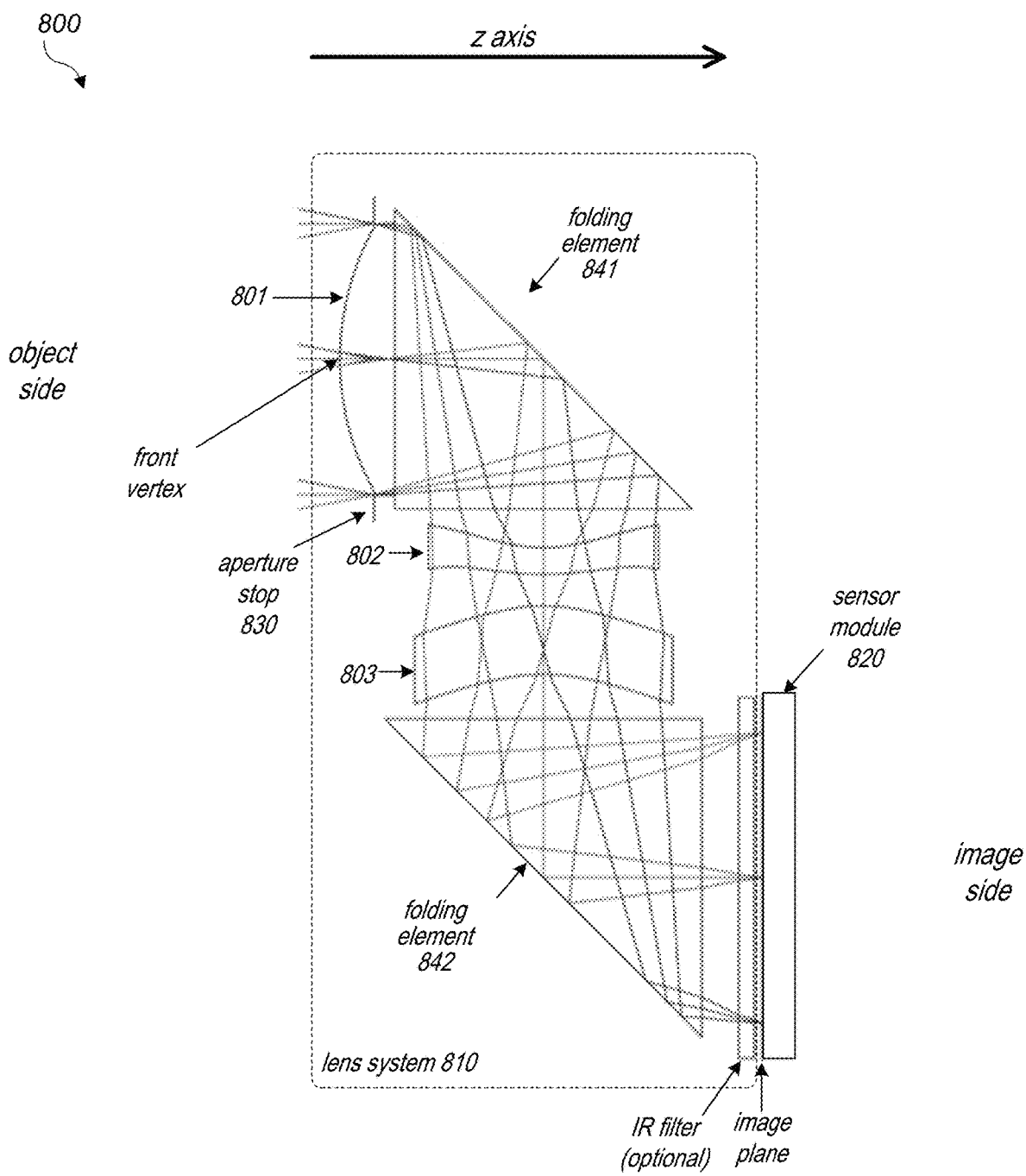
FIGS. 8 through 12 show example alternative embodiments of a folded lens system with two folding elements.

FIG. 8 illustrates an embodiment of a folded lens system with two folding elements and three refractive lens elements. A camera 800 may include a folded lens system 810 with three refractive lens elements 801-803 and two light folding elements 841 and 842 such as prisms that "fold" the optical axis of the lens system 810. The first folding element 841 folds the optical axis from a first axis that is parallel to the incoming light direction to a second axis that is orthogonal to the incoming light direction. The second folding element 842 folds the optical axis from the second axis to a third axis that is parallel to the incoming light direction. The camera 800 may also include an aperture stop 830, an optional infrared (IR) filter, and a sensor module 820. In some embodiments, sensor module 820 may be shifted relative to the lens system 810 to allow refocusing of the lens system 810 between Infinity conjugate and Macro conjugate. As an alternative, in some embodiments, the camera 800 may include one or more solid-state optical actuator components that provide AF functionality for the camera 800.

FIG. 9 illustrates an embodiment of a camera 900 including a folded lens system 910 similar to the folded lens system 810 as illustrated in FIG. 8. However, in camera 900, folding element 942 and sensor module 920 are rotated 180 degrees around the second axis (AX 972) so that sensor module 920 is at the front of the camera 900.

FIG. 10 illustrates an embodiment of a folded lens system with two folding elements and four refractive lens elements. FIG. 10 illustrates an embodiment in which a refractive lens element 1004 is integrated with the folding element 1042 in the third group. A camera 1000 may include a folded lens system 1010 with four refractive lens elements 1001-1004 and two light folding elements 1041 and 1042 such as prisms that "fold" the optical axis of the lens system 1010. The first folding element 1041 folds the optical axis from a first axis that is parallel to the incoming light direction to a second axis that is orthogonal to the incoming light direction. The second folding element 1042 folds the optical axis from the second axis to a third axis that is parallel to the incoming light direction. As shown in FIG. 10, lens element 1004 may be integrated with folding element 1042 on the third axis. The camera 1000 may also include an aperture stop 1030, an optional infrared (IR) filter, and a sensor module 1020. In some embodiments, sensor module 1020 may be shifted relative to the lens system 1010 to allow refocusing of the lens system 1010 between Infinity conjugate and Macro conjugate. As an alternative, in some embodiments, the camera 1000 may include one or more solid-state optical actuator components that provide AF functionality for the camera 1000.

FIG. 11 illustrates another embodiment of a folded lens system with two folding elements in which a refractive lens element is integrated with the folding element in the third group. A camera 1100 may include a folded lens system 1110 with four refractive lens elements 1101-1104 and two light folding elements 1141 and 1142 such as prisms that "fold" the optical axis of the lens system 1110. The first folding element 1141 folds the optical axis from a first axis that is parallel to the incoming light direction to a second axis that is orthogonal to the incoming light direction. The second folding element 1142 folds the optical axis from the second axis to a third axis that is parallel to the incoming light direction. As shown in FIG. 11, lens element 1104 may be integrated with folding element 1142 on the second axis. The camera 1100 may also include an aperture stop 1130, an optional infrared (IR) filter, and a sensor module 1120. In some embodiments, sensor module 1120 may be shifted relative to the lens system 1110 to allow refocusing of the lens system 1110 between Infinity conjugate and Macro conjugate. As an alternative, in some embodiments, the camera 1100 may include one or more solid-state optical actuator components that provide AF functionality for the camera 1100.

FIG. 12 illustrates another embodiment of a folded lens system with two folding elements and four refractive lens elements in which a refractive lens element is integrated with the folding element in the third group. A camera 1200 may include a folded lens system 1210 with four refractive lens elements 1201-1204 and two light folding elements 1241 and 1242 such as prisms that "fold" the optical axis of the lens system 1210. The first folding element 1241 folds the optical axis from a first axis that is parallel to the incoming light direction to a second axis that is orthogonal to the incoming light direction. The second folding element 1242 folds the optical axis from the second axis to a third axis that is parallel to the incoming light direction. As shown in FIG. 12, lens element 1204 may be integrated with folding element 1242 on the second axis. The camera 1200 may also include an aperture stop 1230, an optional infrared (IR) filter, and a sensor module 1220. In some embodiments, sensor module 1220 may be shifted relative to the lens system 1210 to allow refocusing of the lens system 1210 between Infinity conjugate and Macro conjugate. As an alternative, in some embodiments, the camera 1200 may include one or more solid-state optical actuator components that provide AF functionality for the camera 1200.

Example Flowchart

FIG. 13 is a flowchart of a method for capturing images using embodiments of a camera as illustrated in FIGS. 2A through 12, according to some embodiments As indicated at 1900, light from an object field in front of the camera is received through a front aperture stop at a first lens element on a first axis. In some embodiments, the aperture stop may be located at the first lens element and behind the front vertex of the lens system. As indicated at 1910, the first lens element refracts the light to a first light folding element such as a prism. As indicated at 1920, the light is redirected by the first folding element to a second axis. As indicated at 1930, the light is then refracted by one or more lens elements on the second axis to a second light folding element such as a prism. As indicated at 1940, the light is redirected by the second light folding element to a third axis. As indicated at 1950, the light forms an image at an image plane at or near the surface of a sensor module on the third axis. As indicated at 1960, the image is captured by the photosensor.

In some embodiments, at least one refractive lens element may be located on the third axis, for example as illustrated in FIG. 10. In these embodiments, the light that is redirected by the second light folding element to the third axis is refracted by the lens element(s) on the third axis to form the image at the sensor module.

While not shown in FIG. 13, in some embodiments, the light may pass through an infrared filter that may for example be located between the second light folding element and the sensor module. In some embodiments, the lens system is a fixed-focus lens. However, in some embodiments, the sensor module may be mechanically moved on the third axis relative to the second light folding element to provide autofocus (AF) functionality for the camera, or alternatively the lens system may be mechanically moved on the third axis relative to the sensor module. As an alternative, in some embodiments the lens system may include one or more solid-state optical actuator components that provide AF functionality for the camera without requiring any of the components to be moved. For example, in some embodiments, an optical actuator component may be located on the object side of the first lens element, and in some embodiments, a first optical actuator component may be located on the first axis on the object side of the first lens element, and a second optical actuator component may be located on the second axis between the last refractive lens element on the second axis and the second light folding element.

In some embodiments, the components of the lens system referred to in FIG. 13 may be configured as illustrated in any of FIGS. 2A, 3A, 4A, 4D, 5A, 6A, 6D, or 7A. In some embodiments, the components of the lens system referred to in FIG. 13 may be configured as illustrated in any of FIGS. 8 through 12. However, note that variations on the examples given in the Figures are possible while achieving similar optical results.

Example Computing Device

FIG. 14 illustrates an example computing device, referred to as computer system 2000, that may include or host embodiments of a camera with a lens system as illustrated in FIGS. 1 through 13. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more cameras as described above with respect to FIGS. 1 through 13, which may also be coupled to I/O interface 2030, or one or more cameras as described above with respect to FIGS. 1 through 13 along with one or more other cameras such as conventional wide-field cameras.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 16, memory 2020 may include program instructions 2022, which may be processor-executable to implement any element or action to support integrated camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A lens system, comprising:
a plurality of elements arranged along a folded optical axis of the lens system, wherein the plurality of elements includes, in order along the folded optical axis from an object side to an image side:
a first group of elements comprising:
a first refractive lens element with positive refractive power on a first portion of the folded optical axis having a convex object-side surface in the paraxial region; and
a first light folding element that redirects light from the first refractive lens element to a second portion of the folded optical axis;
a second group of elements comprising one or more refractive lens elements on the second portion of the folded optical axis; and
a third group of elements comprising a second light folding element that redirects light from the second portion of the folded optical axis to a sensor on a third portion of the folded optical axis;
wherein SD is semi-diagonal image height of the sensor, wherein the paraxial optical path length (OPL1) of the first group satisfies the condition 0.5<OPL1/SD<2, and wherein the paraxial optical path length (OPL2) of the third group satisfies the condition 0.6<OPL2/SD<2.

2. The lens system as recited in claim 1, wherein the lens system further comprises an aperture stop located on the first portion of the optical axis between the front vertex of the first refractive lens element and the first light folding element.

3. The lens system as recited in claim 1, wherein the lens system provides a 35 mm equivalent focal length in the range of 70-200 mm and less than 6.5 mm of Z-height measured from a front vertex of the lens system to a rear vertex of the lens system.

4. The lens system as recited in claim 1, wherein at least one surface of at least one of the refractive lens elements is aspheric.

5. The lens system as recited in claim 1, wherein at least one of the refractive lens elements is formed of lightweight polymer or plastic material.

6. The lens system as recited in claim 1, wherein the first light folding element is a prism.

7. The lens system as recited in claim 6, wherein an image side surface of the first refractive lens element is flat/plano, and wherein the image side surface of the first refractive lens element is in contact with the object side surface of the prism.

8. The lens system as recited in claim 6, wherein the prism is composed of a material that satisfies the condition:

$$1.5<Nd<2.1,$$

where Nd is refractive index of the prism.

9. The lens system as recited in claim 1, wherein the second light folding element is a prism.

10. The lens system as recited in claim 9, wherein the third group further includes a refractive lens element integrated with the prism.

11. The lens system as recited in claim 1, wherein the first group satisfies the conditions:

$$f1>fsys; \text{ and}$$

$$0.6<|fsys/f1|<1.05;$$

where f1 is effective focal length of the first group, and fsys is effective focal length of the lens system.

12. The lens system as recited in claim 1, wherein the second group satisfies the conditions:

$$|f2|>fsys; \text{ and}$$

$$0.05<|fsys/f2|<0.25; \text{ and}$$

$$|f2|>f1;$$

where f2 is effective focal length of the second group, fsys is effective focal length of the lens system, and f1 is effective focal length of the first group.

13. The lens system as recited in claim 1, wherein at least one refractive lens element in the second group has negative refractive power and satisfies the condition:

$$Vd_A<30;$$

where $Vd_A$ is Abbe number of the refractive lens element, and wherein at least one other refractive lens element in the second group satisfies the condition:

$$Vd_B<50;$$

where VdB is Abbe number of the other refractive lens element.

14. The lens system as recited in claim 1, wherein the lens system further includes an infrared filter located on an image side of the second light folding element.

15. The lens system as recited in claim 1, wherein the lens system further includes one or more optical actuators that provide autofocus functionality for the lens system.

16. The lens system as recited in claim 1, wherein the second group comprises three refractive lens elements.

17. The lens system as recited in claim 1, wherein the second group comprises two refractive lens elements.

18. The lens system as recited in claim 1, wherein F-number of the lens system is 2.8 or less.

19. A camera, comprising:
a sensor module configured to capture light projected onto a surface of the sensor module; and
a folded lens system configured to refract light from an object field located in front of the camera to form an image of a scene at an image plane at or near the surface of the sensor module, wherein the lens system comprises:
  a first group comprising:
    a first refractive lens element with positive refractive power on a first portion of an optical axis having a convex object-side surface in the paraxial region; and
    a first light folding element that redirects light from the first refractive lens element to a second portion of the optical axis;
  a second group comprising two or more refractive lens elements on the second portion of the optical axis; and
  a third group comprising a second light folding element that redirects light from the second portion of the optical axis to the sensor module on a third portion of the optical axis;
wherein the folded lens system provides a 35 mm equivalent focal length in the range of 70-200 mm and 6.5 mm or less of Z-height measured from a front vertex of the folded lens system to a rear vertex of the folded lens system.

20. The camera as recited in claim 19, wherein SD is semi-diagonal image height of the sensor module, wherein the paraxial optical path length (OPL1) of the first group satisfies the condition 0.5<OPL1/SD<2, and wherein the paraxial optical path length (OPL2) of the third group satisfies the condition 0.6<OPL2/SD<2.

21. The camera as recited in claim 19, wherein the first light folding element is a prism, wherein an image side surface of the first refractive lens element is flat/plano, and wherein the image side surface of the first refractive lens element is in contact with the object side surface of the prism.

22. The camera as recited in claim 19,
wherein the first group satisfies the conditions:

$f1>fsys$; and $0.6<|fsys/f1|<1.05$;

where f1 is effective focal length of the first group, and fsys is effective focal length of the lens system;

wherein the second group satisfies the conditions:

$|f2|>fsys$; and $0.05<|fsys/f2|<0.25$; and $|f2|>f1$;

where f2 is effective focal length of the second group;
wherein at least one refractive lens element in the second group has negative refractive power and satisfies the condition $Vd_A<30$, where $Vd_A$ is Abbe number of the refractive lens element; and
wherein at least one other refractive lens element in the second group satisfies the condition $Vd_B>50$, where $Vd_B$ is Abbe number of the other refractive lens element.

23. A device, comprising:
one or more processors;
one or more cameras; and
a memory comprising program instructions executable by at least one of the one or more processors to control operations of the one or more cameras;
wherein at least one of the one or more cameras is a camera comprising:
  a sensor module configured to capture light projected onto a surface of the sensor module; and
  a folded lens system configured to refract light from an object field located in front of the camera to form an image of a scene at an image plane at or near the surface of the sensor module, wherein the lens system comprises:
    a first group comprising a first refractive lens element with positive refractive power on a first portion of an optical axis having a convex object-side surface in the paraxial region and a first light folding element that redirects light from the first refractive lens element to a second portion of the optical axis;
    a second group comprising two or more refractive lens elements on the second portion of the optical axis; and
    a third group comprising a second light folding element that redirects light from the second portion of the optical axis to the sensor module on a third portion of the optical axis;
  wherein the folded lens system provides a 35 mm equivalent focal length in the range of 70-200 mm and 6.5 mm or less of Z-height measured from a front vertex of the folded lens system to a rear vertex of the folded lens system.

* * * * *